(12) United States Patent
Liang et al.

(10) Patent No.: US 10,412,206 B1
(45) Date of Patent: Sep. 10, 2019

(54) COMMUNICATIONS FOR MULTI-MODE DEVICE

(71) Applicant: Amazon Technologies, Inc., Seattle, WA (US)

(72) Inventors: Nancy Yi Liang, Seattle, WA (US); Sandra Lemon, II, Bothell, WA (US); James Marvin Freeman, II, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/003,803

(22) Filed: Jun. 8, 2018

(51) Int. Cl.
*H04M 1/64* (2006.01)
*H04M 1/27* (2006.01)
*H04M 3/42* (2006.01)
*H04M 3/02* (2006.01)

(52) U.S. Cl.
CPC ............. *H04M 1/271* (2013.01); *H04M 3/02* (2013.01); *H04M 3/42068* (2013.01)

(58) Field of Classification Search
CPC ..... H04M 1/271; H04M 3/02; H04M 3/42068
See application file for complete search history.

(56) References Cited

U.S. PATENT DOCUMENTS

| | | | |
|---|---|---|---|
| 9,241,257 B1 * | 1/2016 | Kim | H04W 8/22 |
| 2005/0235158 A1 * | 10/2005 | Shaffer | H04M 3/42272 |
| | | | 713/184 |
| 2007/0208992 A1 * | 9/2007 | Koren | G06Q 10/10 |
| | | | 715/212 |
| 2007/0293193 A1 * | 12/2007 | Ramsten | H04M 1/2745 |
| | | | 455/411 |
| 2015/0156274 A1 * | 6/2015 | Alten | G06F 16/16 |
| | | | 709/204 |
| 2016/0050289 A1 * | 2/2016 | Cohen | H04L 67/30 |
| | | | 709/204 |
| 2018/0096113 A1 * | 4/2018 | Hassan | G06F 21/10 |

* cited by examiner

*Primary Examiner* — Simon King
(74) *Attorney, Agent, or Firm* — Eversheds Sutherland (US) LLP

(57) ABSTRACT

Systems, methods, and computer-readable media are disclosed for systems and methods for dynamic mode switching and management of communications between devices. Example methods include receiving a first event from a first application on a first device, determining a first application identifier of the first application, and determining that the first device is in a communal mode. Example methods may include determining a communal mode profile for the first device, where the communal mode profile is associated with a first user account identifier that is associated with the first device, determining a set of user account identifiers associated with an accessory device identifier of the accessory device, and associating the set of user account identifiers and the accessory device identifier with the communal mode profile. Example methods may include receiving an indication of a second event, and disassociating the set of user account identifiers from the communal mode profile.

20 Claims, 14 Drawing Sheets

COMMUNICATIONS FOR MULTI-MODE DEVICE

BACKGROUND

Electronic devices, such as smartphones, tablets, computers, and so forth may be used by users to send messages, make calls, and for other forms of communication. To reach a particular person, a user may call the person's device, such as a mobile phone, and the person may answer the device. In some instances, the person may be notified that the user is calling the person's device. However, users may have more than one device, and more than one user may use a device for communication.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
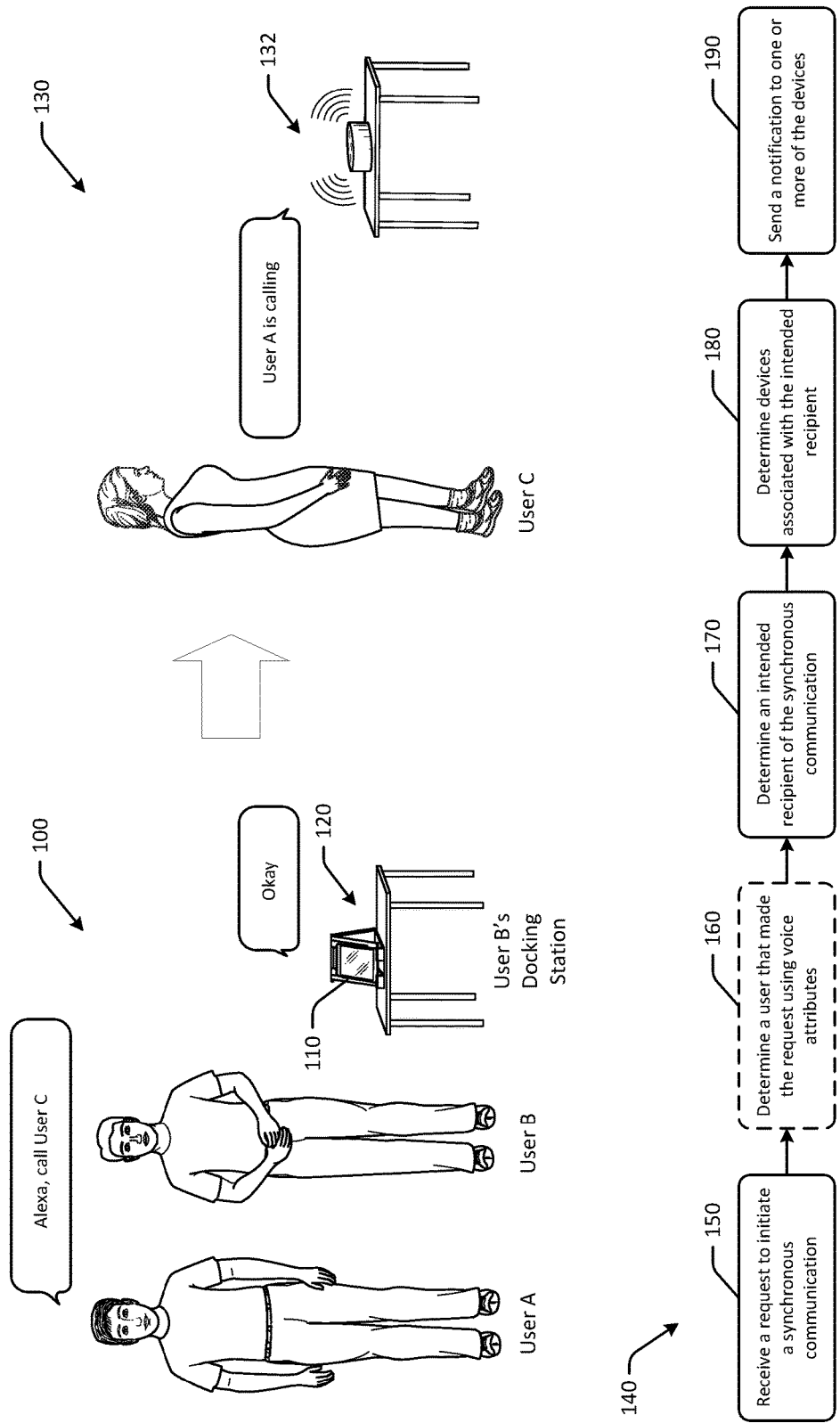
FIG. 1 is a schematic illustration of an example use case and process flow for dynamic mode switching and management of communications between devices in accordance with one or more example embodiments of the disclosure.

Electronic devices, such as tablets, smartphones, computers, speaker devices, smart home devices, and the like may be used for communication, such as sending and receiving messages, placing and receiving (or otherwise facilitating) synchronous communication session (e.g., telephone calls, video calls, VOIP-based calls, etc.), and other forms of communication. Such devices may be personal devices, in that a particular device may be associated with a particular device identifier (a hardware identifier, a telephone number, or another type of device identifier), and/or a particular device may be associated with a particular user account identifier or other user-specific identifier. For example, a user may have a smartphone device that is associated with a telephone number, such that telephone calls to the telephone number result in a connection attempt at the smartphone device. The smartphone device, and/or one or more applications on the smartphone device, may be also be associated with one or more user account identifiers. For example, the smartphone device may have an instant message application on the smartphone device, and the instant message application may be associated with a username, user email address, or other type of user identifier. Messages sent to, or telephone calls to, the user identifier using the instant message application may be directed to the smartphone device, as well as any other devices on which the instant message application is available and is associated with the same user identifier. Accordingly, device-specific or application-specific information may be used to determine devices to which communications are sent and/or initiated.

In another example, if a user makes a telephone call using a telephone number, one or more devices associated with the telephone number may present notifications (e.g., ringtone, vibrate, etc.), indicating that a telephone call is incoming. In one example, multiple devices may be associated with a landline telephone number, and one or more of the devices may present notifications. If the user makes a telephone call or sends a message using a different user identifier, such as an email address, screenname, user account identifier, and so forth, one or more devices associated with the user identifier, and/or devices with applications that are associated with the user identifier, may present notifications. For example, a smartphone, tablet, and laptop device may present audible or visual notifications of the incoming message and/or telephone call.

In some instances, devices may be associated with more than one user identifier. For example, a smart speaker device may be associated with multiple user accounts for users that reside at the same residence. In another example, a tablet device may be associated with multiple user accounts of users that may use the tablet device. Some devices may be associated with a single user account at certain times, and with multiple user accounts at other times. In some instances, a single device may have multiple applications, each of which could have their own respective user identifiers associated thereto.

Embodiments of the disclosure include systems and methods for dynamically switching modes of devices from a personal mode to a communal mode, and/or from a communal mode to a personal mode. Certain embodiments may manage communications between devices based at least in part on a mode of a device, and the associated user accounts. Some embodiments may manage devices to which notifications of incoming communications are sent, as well as determining recipient user information and related devices for outgoing communications.

Devices may switch, and/or may be caused to switch, between a personal mode and a communal mode. A personal mode may be a mode in which a single user account is active at a device. For example, a single user account may be logged in at the device, a default user account may be active, a single user account may be logged in at an application on the device, and so forth. Additional user accounts may be prevented from being accessed at the device while the device is in the personal mode. In some embodiments, activating an additional user account at a device that is in personal mode may cause the device to activate a communal mode. Personal modes may be specific to particular applications or other types of functions of the device. For example, while a device is in communal mode, a social networking application may still be in personal mode. Accordingly, while a device may be in a certain mode for communications, applications of the device may be in a different mode, and/or a type of device function may be in a different mode.

A communal mode may be a mode in which at least one communal account is active at a device, where the communal account is inclusive of multiple personal accounts. For example, a communal account may include the personal accounts of multiple users residing in a household. In communal mode, additional accounts can be activated at the device, and/or may be logged in at the device or at an application on the device. Activating additional user accounts, and/or associating additional user identifiers, at a device may cause notifications of incoming communications for some or all of the associated user accounts to be presented at the device. Communal modes may include a predefined set of associated user accounts or an undefined set of user accounts. A predefined set of associated user accounts may activate a certain set of user accounts when the device is in the communal mode, and other user accounts may be optionally prevented from being associated with the device. An undefined set of user accounts may be an open-ended set of associated user accounts, where any number of devices or user accounts may be associated with the device, regardless of whether the user account is approved.

This disclosure relates to, among other things, devices, systems, methods, computer-readable media, techniques, and methodologies for dynamic mode switching and management of communications between devices. Certain embodiments manage changes to modes of devices by sending directives or commands to devices to activate a specific event listener to either listen for events in a personal mode or to listen for events in a communal mode.

In some embodiments, devices may dynamically switch between personal modes and communal modes based at least in part on commands from one or more remote servers. In other instances, devices may dynamically switch between personal modes and communal modes based at least in part on a location of the device, an accessory device that the device is coupled to, such as a docking station, a WiFi network that the device is connected to, devices that are in proximity to the device, voices of users that are in an ambient environment of the device, and other factors.

Certain embodiments may cause devices to dynamically switch between personal and communal modes, and may automatically determine user accounts, user identifiers, and/or telephone numbers that are to be associated with a certain device at a particular time. As a result, devices may be used to facilitate communications for users and to notify users of associated user accounts based at least in part on a personal or communal mode of the device.

Referring to FIG. 1, an example use case for dynamic mode switching and management of communications between devices is depicted in accordance with one or more example embodiments of the disclosure. In FIG. 1, at a first instance 100, a device 110 may be coupled to an accessory device, such as a docking station 120. In other embodiments, the device may be coupled to a different accessory device, such as a charger, charging station, docking station, stand, cradle, and/or may be positioned in a certain orientation (e.g., as determined using one or more sensors of the device 110, etc.). Based at least in part on the coupled accessory, such as the docking station 120 in FIG. 1, the device 110 may be caused to activate a communal mode. For example, the docking station 120 may be positioned in a kitchen of a household, and may therefore be associated with multiple user accounts for users in the household (e.g., a mom's user account, a dad's user account, a child's user account, etc.). Accordingly, while coupled to the docking station 120, the device 110 may be in a communal mode. As a result, communications for any of the users in the household may be optionally delivered to the device 110, and notifications of such communications may be presented at the device 110. In some instances, the device 110 may not be coupled to any accessory device, but may be in a communal mode. In such instances, communications for user accounts associated with the device 110 in the communal mode and/or notifications for such communications may be sent to the device 110. Although described in the context of accessory devices, the device 110 may be coupled to any suitable device.

In the example of FIG. 1, the docking station 120 may belong to User B and may be associated with a location of User B's house. User identifiers of users in User B's household may be associated with the location of User B's house and/or a device identifier of the docking station 120. Accordingly, when a device coupled to the docking station 120 is in communal mode, the user identifiers of the users in User B's household may be at least temporarily associated with the device while the device is in communal mode and/or coupled to the docking station 120. This is because while the device is at the docking station 120, the device is in User B's house.

In some embodiments, any device coupled to the docking station 120 may be associated with the user identifiers of User B's household, regardless of whether or not the device itself is associated with a user identifier of User B's household. For example, in FIG. 1, User B's friend User A may be visiting User B's house. The device 110 may be User A's device, and a device identifier of the device 110 may be associated with User A's user account. User A may couple the device 110 to User B's docking station 120.

When the device 110 is coupled to the docking station 120, the device 110 may switch from a personal mode, in which User A's user account is associated with the device 110, to a communal mode, in which one or more of the user accounts in User B's household are associate with the device 110, in addition to User A's user account. As a result, notifications of incoming calls or messages for any of the associated user accounts may be presented at User A's device 110.

To dynamically switch modes and manage communications between devices, an example process flow 140 is presented and may be performed, for example, by one or more remote servers or at a device locally. Dynamically switching from a personal mode to a communal mode may include activating a communal profile at a device (with which multiple personal accounts may be associated), and dynamically switching from a communal mode to a personal mode may include activating a single user account and the device and/or deactivating a communal profile. The remote server and/or device may include at least one memory that stores computer-executable instructions and at least one processor configured to access the at least one memory and execute the computer-executable instructions to perform various actions or operations, such as one or more of the operations in a process flow 140 of FIG. 1.

At a first block 150, a request to initiate a synchronous communication session, such as a call, may be received. For example, as illustrated in FIG. 1, while the device 110 is docked at the docking station 120, User A may audibly say an audio command of "Alexa, call User C." The audio command may be captured by the device 110 or another computer system using one or more microphones. A meaning of the audio command may be determined using speech-to-text processing and/or natural language processing. In FIG. 1, the device 110 or a remote server may determine that a meaning of User A's audio command is a request to initiate a synchronous communication session to User C. In some instances, a wake word, such as "Alexa," may be uttered by a user prior to providing subsequent voice input. The wake word may be a command that a user says to interact with a voice assistant. Wake words may generally initiate an audio command or trigger monitoring for audio or sound by a device. Other wake words may be used.

In one example, a remote server may receive audio data from the device 110. The audio data may be representative of a user utterance of User A that was detected in an ambient environment. The remote server may determine that the audio data represents an intent to initiate a synchronous communication session to a named contact. For example, the intent may be to initiate a synchronous communication session, such as a telephone call, to "User C." Names, numbers, email addresses, IP addresses, and/or any other manners of communication identification may be used.

At optional block 160, a user that made the request may be optionally determined using voice attributes. For example, based at least in part on the audio data input at the device 110, a remote server may determine that, of the associated user accounts at the time the request was made (User A's user account and User B's household user accounts), that User A spoke the request. Such a determination may be made based at least in part on an analysis of the audio data, which may indicate at a certain level of confidence whether a certain audio command was spoken by a certain user. In some embodiments, a confidence score associated with a determination may be compared to a threshold to determine whether the confidence score satisfies a minimum level of certainty that a particular user spoke a voice input or audio command. In the example of FIG. 1, a determination may be made that the user that made the request was User A.

At block 170, an intended recipient of the synchronous communication session may be determined. For example, the name User C may be extracted from the audio command and may be determined to be a name. Based at least in part on the name, a remote server may determine or access one or more contact lists for associated user accounts. The contact lists may be searched for the name "User C" to determine whether a "User C" is present in one or more of the contact lists of user accounts associated with the device 110.

Specifically, a remote server may determine a set of user account identifiers associated with the device identifier of the device 110. The set of user account identifiers may include a first user account identifier for User A and a second user account identifier for User B, among others. A first contact list associated with User A's user account identifier may be determined, and a second contact list associated with User B's user account identifier may be determined. The remote server may determine whether the name "User C" is present in any of the contact lists. If the name is present in only one of the contact lists associated with the device at the time the request is made, the remote server may determine that that contact is the intended recipient of the synchronous communication session. If the name is present in more than one of the contact lists, the remote server may determine a priority or ranking of the multiple contacts to determine a most likely intended recipient. In the example of FIG. 1, if it was determined that the voice request was made by User A, the "User C" in User A's contact list is the likely intended recipient. Other prioritization techniques may be used to determine an intended recipient.

At block 180, devices associated with the intended recipient may be determined. For example, once the contact is determined from the contact list, a set of device identifiers associated with the contact may be determined, so that a notification of the incoming synchronous communication session may be sent to the correct devices. In this example, a user account identifier that is associated with the name "User C" may be determined. Using the user account identifier, a set of device identifiers associated with User C's user account identifier may be determined. The set of device identifiers may represent devices that are to be notified for synchronous communication sessions for User C's user account identifier. The set of device identifiers may include a device identifier of, for example, User C's smartphone, and a device identifier of a speaker device at, for example, User C's home.

At block 190, a notification may be sent to one or more of the devices. For example, a notification of an incoming synchronous communication session may be sent to one or more of the devices associated with User C's user identifier. In some instances, notifications may be sent to all of the devices associated with User C's user identifier, such as her smartphone and speaker device.

In the example of FIG. 1, an example notification may be sent to User C's speaker device 132, which may be associated with a location of User C's home 130. The notification at the speaker device 132 may be an audible notification and may audibly state "User A is calling." Different devices may have different notifications. For example, User C's smartphone may ring or vibrate, and so forth. The audible notification at the speaker device 132 may be specific, such as in the illustration of FIG. 1, where the actual caller's name, User A, is used in the notification. In other instances where the actual caller is unknown, and/or was not identified using the audio data, a generic notification such as "you have a call" may be presented.

In some embodiments, a remote server may send a first synchronous communication session notification to the speaker device identifier indicative of an incoming telephone call (or other synchronous communication session) from User A's user account. A second synchronous communication session notification may be sent to a device identifier of User C's smartphone, and so forth.

User C may accept the incoming synchronous communication session at any device associated with her user account, such as at the speaker device 132 by saying "accept the call" or another affirmative response. If the synchronous communication session is accepted, the remote server may receive an indication of acceptance of the incoming synchronous communication session, and may establish a connection between the device 110 and the speaker device 132. The users may then communicate using the devices.

Certain embodiments may include accessory devices, such as docking stations, which are associated with particular locations and/or user accounts. For example, a docking station in a master bedroom may be associated with user accounts of a mother and father, so devices (e.g., tablet, phone, speaker device, etc.) docked at that docking station may be in a communal mode and associated with both the mother's user account and the father's user account. As a result, the device may receive notifications for synchronous (e.g., telephone call or other voice-based communication, etc.) or asynchronous (e.g., messages, voicemails, text-based content, etc.) communications intended for the mother's user account or the father's user account. The device may not receive notifications for other user accounts in the same household, such as a daughter's user account or a son's user account.

In contrast, a docking station associated with a living room location in the same household may be associated with each of the user accounts in the household (e.g., mother, father, son, daughter, etc.), and coupled devices may receive notifications for each of the user accounts. Devices coupled to a living room docking station may be communal to the entire household in one example.

In another example, a communal device in a shared bedroom between the son and daughter may be communal between the son and daughter, and both respective user accounts may be associated with the device, and both user accounts may receive notifications and communications at the device.

Certain embodiments may use location technology (e.g., BLUETOOTH® beacon, GPS data, sensors, WiFi networks, etc.) to detect whether a particular device is in proximity to the device in order to determine which user accounts are eligible to receive notifications at the device. For example, if a communal device is in a living room, although there may be an entire household of user accounts eligible to receive notifications and communications at the device, only notifications and communications for users that are in proximity to the device may be presented. For example, if the mother is at work, notifications or communications for the mother may not be presented at the device. Similarly, a docking station or communal device in an office environment may be used to present notifications and communications for users that are present in a vicinity of the communal device.

Embodiments of the disclosure may include dynamic mode switching and management of communications between devices, identification of user accounts that are associated with various device identifiers and/or modes, determination of user accounts associated with certain locations and/or WiFi networks, and the like. Certain embodiments may determine when device modes are to be changed or modified, as well as which device identifiers are associated with which user account identifiers for notifications and communications. Certain embodiments may manage notifications to devices that are actively associated with a user account identifier, as well as establish connections between devices for communications. Embodiments of the disclosure may automatically cause devices to activate personal or communal modes.

Example embodiments of the disclosure provide a number of technical features or technical effects. For example, in accordance with example embodiments of the disclosure, certain embodiments of the disclosure may change device modes based at least in part on voice commands, location, coupled accessory devices, and the like, identify speakers or users using audio data, automatically update active device identifiers associated with user account identifiers, and cause presentation of notifications and messages at appropriate devices. Certain embodiments may enable different modes that may have different associated user accounts. Embodiments may modify notifications to specifically identify a calling user or a user making an incoming call, and/or may generically provide a household identifier or other generic identifier in notifications. As a result of improved functionality, device mode experiences may be bridged across transitions between personal and communal modes, including automatic update of device and user account associations. Embodiments of the disclosure may improve computing efficiency and bandwidth by managing associations between device identifiers and user account identifiers at a remote server. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
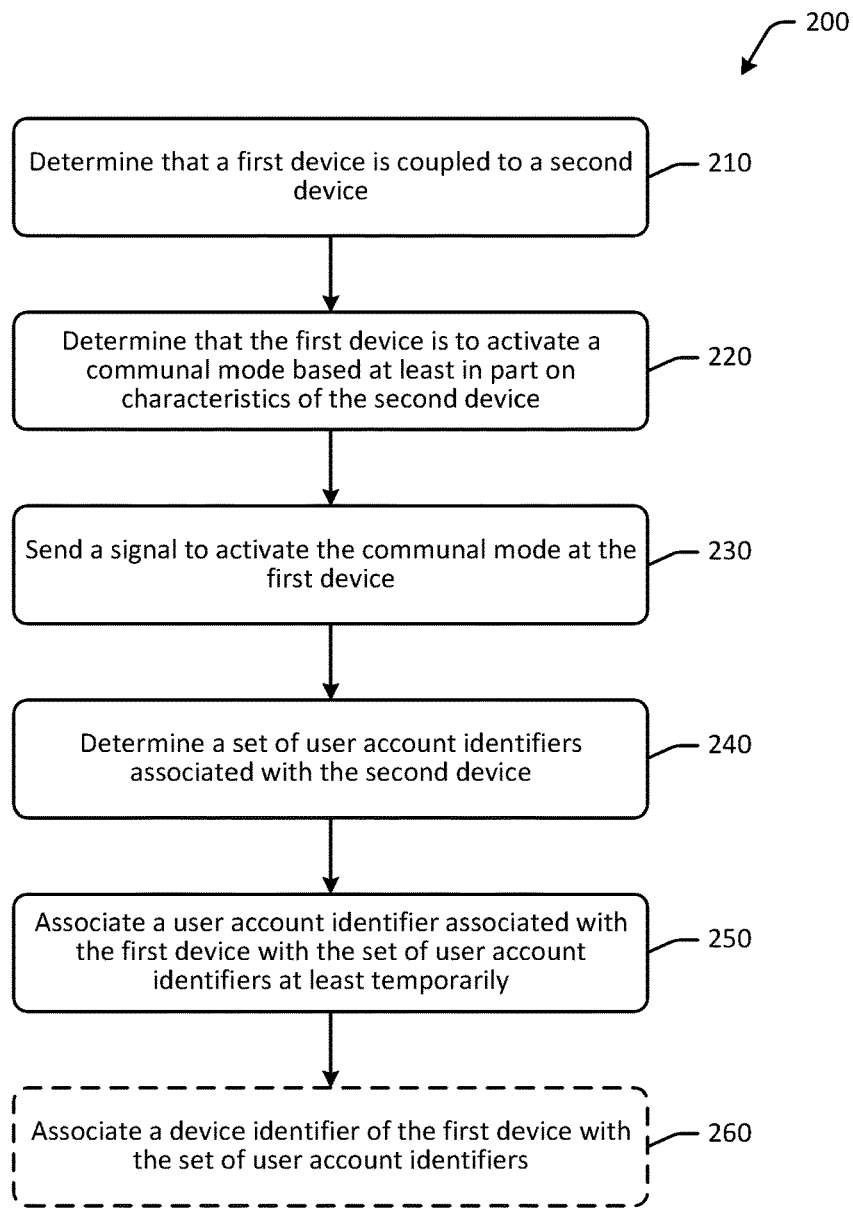
FIG. 2 is a schematic illustration of an example process flow for dynamic mode switching in accordance with one or more example embodiments of the disclosure.

FIG. 2 depicts an example process flow 200 for dynamic mode switching in accordance with one or more example embodiments of the disclosure. While example embodiments of the disclosure may be described in the context of personal and communal modes, and synchronous and asynchronous communication sessions, it should be appreciated that the disclosure is more broadly applicable to any mode available at a device. Some or all of the blocks of the process flows in this disclosure may be performed in a distributed manner across any number of devices. The operations of the process flow 200 may be optional and may be performed in a different order.

At block 210 of the process flow 200, computer-executable instructions stored on memory of a device, such as a remote server or a user device, may be executed to determine that a first device, such as a smart speaker, a tablet, a smartphone, and/or another user device, is coupled to a second device, which may be an accessory device, a tablet, a smartphone, a smart speaker, and/or another user device.

For example, a tablet or other electronic device may have a connector configured to engage an accessory device, such as a wall charger, external battery, docking station, etc., and/or the device may have a connector port configured to receive a connector of an accessory device. The connector and/or connector port may be removably connected to the device. For example, the connector or connector port may be an accessory coupled to the device.

In some embodiments, the device may be physically coupled to an accessory, such as a case or a bumper, which is used to interface with the accessory device, such as a docking station. For example, the accessory may be coupled to an input/output and/or charging port of the charging device or docking station. The accessory may optionally include circuitry and/or an input/output or charging port that couples with the docking station. In other embodiments, the device may not be docked at a docking station, but could be coupled to any power-providing or other accessory device, such as a power cord, charging mat, and the like.

At block 220 of the process flow 200, computer-executable instructions stored on memory of a device, such as a remote server or a user device, may be executed to determine that the first device is to activate a communal mode based at least in part on characteristics of the second device. For example, in some instances, a handshake protocol or exchange between the second device and the first device may be used to identify the second device and/or to determine whether the first device is to activate a certain mode. In some embodiments, determining that a device is connected to an second device may include identifying a second device as a docking station, where coupling to, and/or connecting to, the second device causes an automatic change in the device mode from a personal mode to a communal mode, and/or from a communal mode to a personal mode. Characteristics such as a location of the second devices, an amount of motion of the second device (e.g., an automobile, etc.), associated user accounts, a connected or available WiFi network, and other characteristics may be used to determine that the first device is to activate a communal mode.

Coupling to a second device can include a physical or wireless connection or any other means by which devices are physically and/or communicatively coupled. Second devices, such as accessory devices may be identified, in some instances, using a handshaking protocol or other authentication protocol. In one example, accessory second device may be identified as a docking station. The first device or a remote server may determine, for example using a settings database, that coupling to a certain docking station causes a certain communal mode to be activated.

Devices may be associated with one or more personal modes and/or communal modes. For example, a device may be associated with multiple personal modes, but only one personal mode may be active at a time. For example, a personal mode may correspond to a currently logged in user at the device or at an application on the device. For communal modes, the device may be associated with a predefined group of user accounts that are active in a first communal mode (e.g., the user accounts of members of a household, etc.), while a second communal mode may be a public communal mode in which there may not be any predefined user accounts, but user accounts of nearby users may be associated with the device while the device is in the public communal mode.

Certain embodiments may not need to be coupled to second devices, and may instead have modes that are associated with certain locations, WiFi networks, and/or orientation or positions of the device. For example, a device determined to be at a specific location, such as a public reception area of an office (as opposed to a personal office) or at a living room (as opposed to a bedroom), may be caused to activate a communal mode instead of a personal mode. In another example, connecting to certain WiFi networks, such as a home WiFi network, may cause the device to activate a communal mode. In another example, if it is determined that the device is leaned against a stand or a wall, and/or another second device, the device may activate a communal mode. In some embodiments, if it is determined (e.g., via feedback from one or more accelerometers, gyroscopes, and/or other sensors, etc.) that the device is in a certain position, a communal mode may be activated. For example, leaning the device against a wall, lamp, and/or other structure, as determined by one or more motion sensors for a certain length of time, a communal mode may be activated. In such instances, the second device may not be identified or detected.

In some embodiments, a connection to a certain type of second device, such as a specific docking station (e.g., as determined by a docking station device identifier, etc.), may cause an automatic change to a device mode of the first device from a personal mode to a communal mode. When the first device is decoupled from the second device, the first device may return to, and/or activate, a personal mode. In an example, the first device may be operating in a personal mode prior to being connected to a docking station. When the first device is connected to the docking station, the first device may change the device mode from a personal mode to a communal mode. This may be because multiple users may interact with the first device while it is docked.

At block 230 of the process flow 200, computer-executable instructions stored on memory of a device may be executed to send a signal to activate the communal mode at the first device. For example, in some embodiments, the first device may determine that the communal mode is to be activated locally. In other embodiments, a remote server may determine that the first device is coupled to a certain second device, such as a docking station. Using a device identifier of the docking station, the remote server may determine that the docking station causes coupled devices (e.g., devices connected to the docking station, etc.) to activate a communal mode. The remote server may therefore send a signal, such as a command or directive, to the first device to cause the first device to activate a communal mode. In some embodiments, the signal may cause the first device to activate a certain application or listener to listen for certain events. For example, the first device may have a personal mode application and a communal mode application. The personal mode application may be used to listen for events while in personal mode, and the communal mode application may be used to listen for events while in personal mode. In this example, only one application may be listening at a time in some instances. Events may include notifications, outgoing communication requests, incoming communication requests, and the like.

At block 240, computer-executable instructions stored on memory of a device may be executed to determine a set of user account identifiers associated with the second device. For example, the remote server may determine that the docking station is associated with a predefined set of user accounts, such as user accounts of users in a household or other group. The associated user account identifiers may be the user accounts for which notifications may be presented at the first device while the first device is coupled to the docking station. Similarly, for outgoing communications using the first device while it is coupled to the docking station, contact lists from the associated user account identifiers may be used to identify a recipient of the outgoing communication.

At block 250, computer-executable instructions stored on memory of a device may be executed to associate a user account identifier associated with the first device with the set of user account identifiers at least temporarily. In some instances, the first device may not be associated with a user account identifier that is included in the predefined set of user account identifiers for the second device, and/or in this example, a docking station. For example, a person visiting a friend's home or office may not be associated with a docking station at the friend's home or office. Nonetheless, the person's user account identifier, as determined via association with the person's device identifier, may be added to, and/or otherwise associated with, the friend's docking station while the person's device is coupled to the friend's docking station. As a result, notifications of communications for the person, and/or any of the members of friend's group (e.g., household, etc.) that is associated with the docking station may be presented at the person's device while the person's device is in communal mode and coupled to the friend's docking station. The association between the person's user account identifier and the friend's set of user accounts associated with the docking station identifier may be temporary, such as while the person's device is coupled to the docking station. Once the device is decoupled, the person's device may be removed or disassociated from the friend's docking station, and the friend's set of user accounts may be disassociated from the person's device.

At optional block 260, computer-executable instructions stored on memory of a device may be executed to associate a device identifier of the first device with the set of user account identifiers. For example, the device identifier of the first device may be at least temporarily associated with the set of user account identifiers that is associated with the second device. As a result, notifications intended for users in the set of user account identifiers may be sent to the second device and/or the first device while the first device is in a communal mode. The first device may return to a personal mode manually or automatically when decoupled from the second device.

Figure 3:
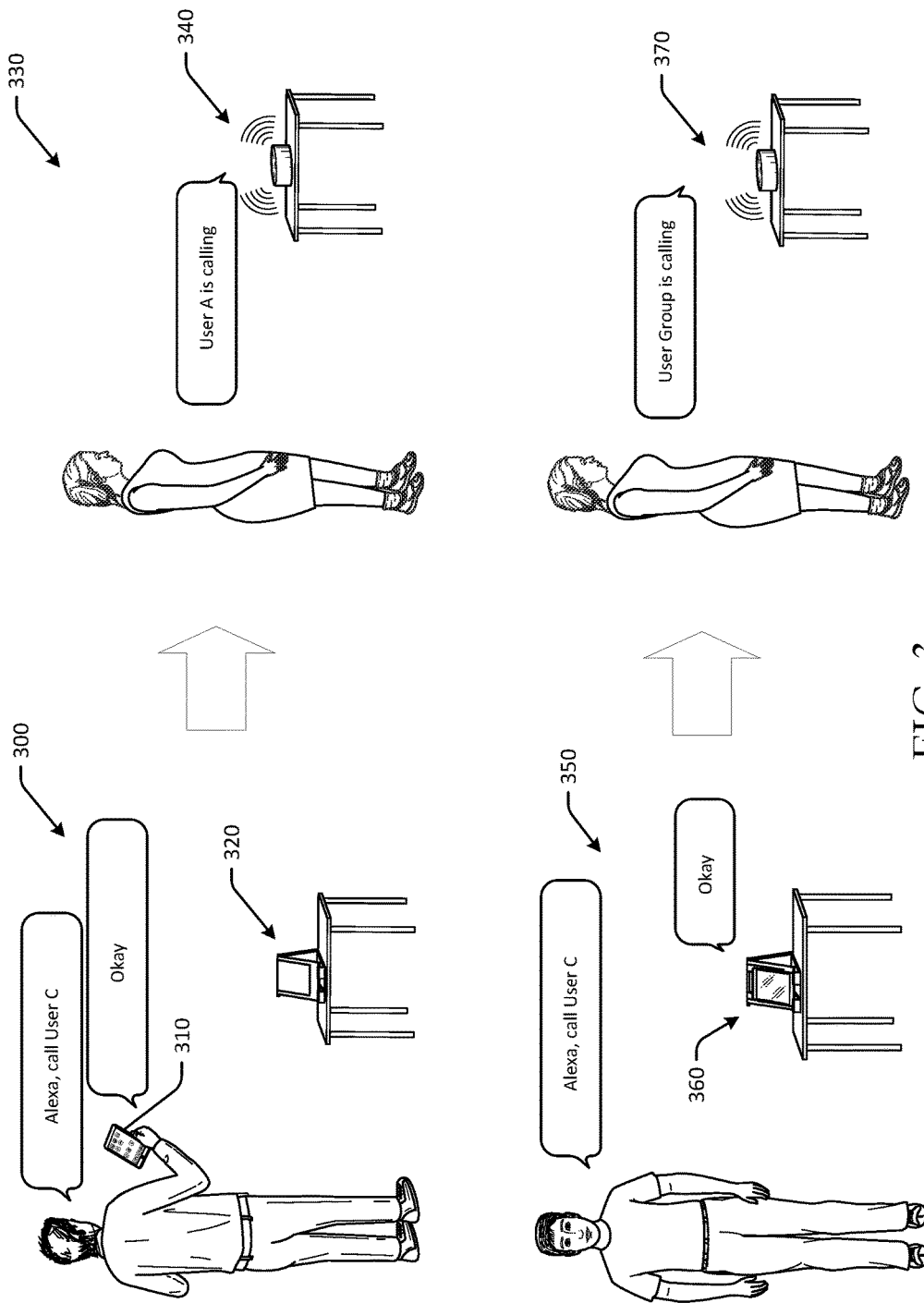
FIG. 3 is a schematic illustration of example use cases for various device notifications in accordance with one or more example embodiments of the disclosure.

FIG. 3 depicts example use cases for various device notifications in accordance with one or more example embodiments of the disclosure. In the example of FIG. 3, at a first instance 300, a device 310 may be in a personal mode. The device 310 may not be coupled to an accessory device, such as docking station 320. While the device is in personal mode, a user may input a request to initiate a communication to another user. Requests may be input using touch input, such as at a display of the device, using voice input, such as by speaking a command, and/or using a different type of input. For example, at the first instance 300, the user may say "Alexa, call User C." A meaning of the voice input may be determined to be an intent to initiate a synchronous communication session to a name of another user, which in this case may be determined to be User C. An affirmative response, such as "okay" may be audibly presented at the device. The name "User C" may be determined in one or more contact lists associated with the user's account identifier. For example, the user making the request may have one or more contact lists associated with the user's account, the device itself, and/or one or more applications on the device. In one example, the contact lists associated with the user account may be searched for "User C," and contact information for "User C" may be identified. For example, a telephone number, a set of device identifiers, and/or a set of user account identifiers associated with the identified "User C" may be determined by one or more remote servers.

Based at least in part on the contact information associated with the intended recipient of the synchronous communication session, a set of device identifiers may be determined. The set of device identifiers associated with User C may include a speaker device 340, as illustrated at a second instance 330. One or more notifications of the incoming synchronous communication session may be sent to one or more of the device identifiers associated with User C. In some embodiments, notifications may be sent by the same or a different remote server.

As illustrated at the second instance 330, a notification of the incoming synchronous communication session may be audibly presented at the second device 340. The notification may state that "User A is calling." The notification may be specific as to the user that initiated the synchronous communication session because the device 310 is in a personal mode, and User A's user account may be logged in at the device. In some embodiments, the name of the user that is logged in at the device may be presented in a notification regardless of whether the user actually made the synchronous communication session, and/or another person using the device while it is logged in under User A's account made the synchronous communication session. In other embodiments, if the synchronous communication session request was a made via voice input, a speaker identification process may be used to determine a likelihood that User A actually made the request before the notification is presented with the specific user's name. If the speaker cannot confidently be identified, a generic notification such as "you have a call" or another generic notification may be presented.

In another example, at a third instance 350, the device 310 may be coupled to the docking station 320 and a communal mode 360 may therefore be activated, either by the device 310 automatically, and/or responsive to a signal from another computing device, such as a remote server. While the device 310 is in the communal mode, a user, which may be the same user as in the first instance 300, may input a voice request to call User C. An affirmative response of "okay" may be presented at the device 310. However, at a fourth instance 370, the speaker device 340 may present a notification of "the User's Group is calling," instead of specifying that the caller is User A. This may be because the device is in a communal mode, and the docking station 320 is associated with the User A family group (e.g., the User A family group may include a set of user account identifiers including User A and other family members, etc.). Because the device 310 was in a communal mode when the request to initiate the synchronous communication session was made, the notification may identify the group as making the synchronous communication session, instead of a particular user. As a result, User C may receive a notification indicating that the group, and/or the User A Group, is making the synchronous communication session, but not a specific person. In some embodiments, speaker identification may be used while in communal mode to determine a specific user that is making a request. If the user is identified, then a specific name may be used in the notification while the device is in communal mode.

In some instances, responsive to a request to initiate a synchronous or asynchronous communication session, such as that illustrated at the third instance 350, the device 310 may audibly query the user to determine the user's identity. For example, the device 310 may audibly present a query of "is this User A or User B" (or any set of users in a group)

to determine the user identity of the requester. The response may be used to modify the notification presented to the recipient (e.g., at the fourth instance 370, the notification may be "User B is calling" instead of the User A Group or another notification, etc.).

One or more remote servers may send notification to devices associated with an intended recipient of a synchronous or asynchronous communication session. For example, the notification at the speaker device 340 in the second instance 330 may be indicative of an incoming synchronous communication session from the first user account identifier, and/or User A's user account, while the notification at the speaker device 340 in the fourth instance 370 may be indicative of an incoming synchronous communication session from a group account identifier, and/or the User A's group account. If User C accepts the synchronous communication session, a remote server may receive an indication of acceptance of the incoming synchronous communication session from the speaker device 340, and may establish, and/or facilitate, a connection between the device 310 and the speaker device 340.

Figure 4:
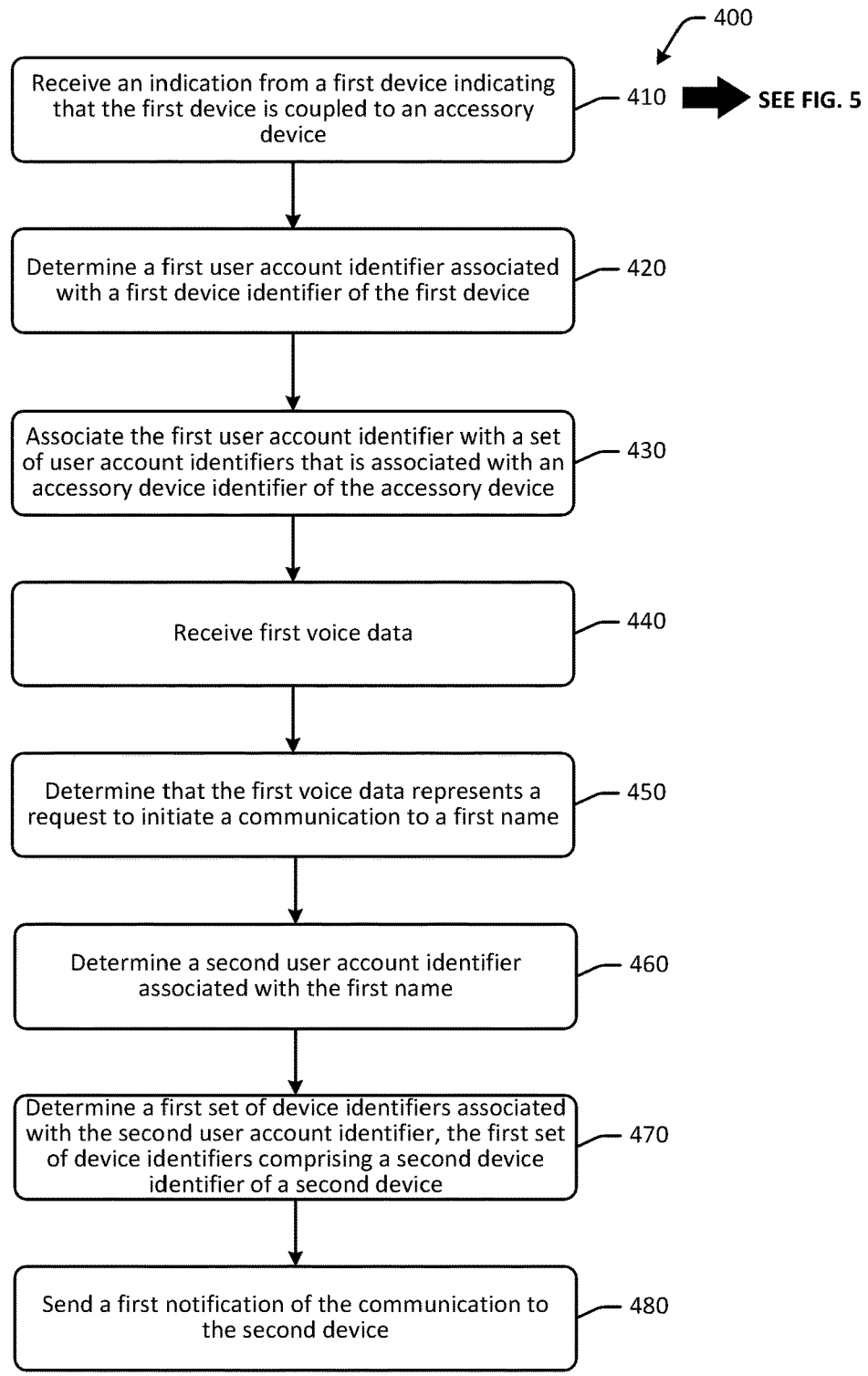
FIG. 4 is a schematic illustration of an example process flow for management of communications between devices in accordance with one or more example embodiments of the disclosure.

FIG. 4 is a schematic illustration of an example process flow 400 for management of communications between devices in accordance with one or more example embodiments of the disclosure. While example embodiments of the disclosure may be described in the context of personal and communal modes, and synchronous and asynchronous communication sessions, it should be appreciated that the disclosure is more broadly applicable to any mode available at a device. Some or all of the blocks of the process flows in this disclosure may be performed in a distributed manner across any number of devices. The operations of the process flow 400 may be optional and may be performed in a different order.

At block 410 of the process flow 400, computer-executable instructions stored on memory of a device, such as a remote server or a user device, may be executed to receive an indication from a first device indicating that the first device is coupled to an second device. For example, a remote server may receive an indication from a user device or an second device indicating that the user device is coupled to the second device. The remote server may associate and/or disassociate various identifiers with the second device based at least in part on a number of characteristics, as discussed with respect to FIG. 5. In one example, a device may be coupled to docking station or charging device, and the device or the docking station/charging device may send an indication of the coupling to the remote server. The remote server may send a signal, such as a command or directive, to the device and/or the docking station/charging device that causes the device to activate a communal mode in some embodiments, such as instances where the second device is associated with a communal mode. In some instances, the device may automatically switch to, and/or activate, a communal mode when coupled to the second device.

At block 420 of the process flow 400, computer-executable instructions stored on memory of the device may be executed to determine a first user account identifier associated with a first device identifier of the first device. For example, the remote server may determine a device identifier of the first device, and may identify or determine a user account identifier that is associated with the device identifier. For example, the device identifier may be a serial number, and the user account identifier may be an email address that is associated with the serial number. In another example, the device identifier may be a MAC address and the user account identifier may be a telephone number. In a personal mode, the device may use the user account identifier for communications.

At block 430 of the process flow 400, computer-executable instructions stored on memory of the device may be executed to associate the first user account identifier with a set of user account identifiers that is associated with an second device identifier of the second device. For example, the second device may be a docking station. The remote server may determine a device identifier of the docking station, which may be a static or dynamic hardware identifier. In some instances, the second device may be associated with certain locations (e.g., internal locations such as bedroom or living room, etc., and/or generic locations such as beach house, etc.), geographies, WiFi networks, and other items. The associations between the second device identifier and other identifiers or data may be used to determine which user account identifiers are to be included in communal modes for devices that are coupled to the second device.

At block 440 of the process flow 400, computer-executable instructions stored on memory of the device may be executed to receive first audio data. For example, the first device may capture voice or audio input using one or more microphones, and may convert the voice input to first audio data or audio data. The first device may send the first audio data to one or more remote servers, and the one or more remote servers may receive the first audio data.

At block 450 of the process flow 400, computer-executable instructions stored on memory of the device may be executed to determine that the first audio data represents a request to initiate a communication to a first name. For example, the remote server may convert the first audio data to text and may parse and process the text to determine an intent of the first audio data. Particularly, the remote server may determine that the first audio data represents an intent to initiate a communication to a certain user identified by the user's name. The communication may be an asynchronous communication session, such as a text message, and/or a synchronous communication session, such as a phone call.

At block 460 of the process flow 400, computer-executable instructions stored on memory of the device may be executed to determine a second user account identifier associated with the first name. For example, the remote server or another server may determine one or more contact lists associated with the first user account identifier and/or the first device identifier. The server may search the contact list(s) for the name determined in the request. After the name is identified in a contact list, the server may determine a second user account identifier associated with the first name, such as a telephone number, email address, screenname, and so forth.

At block 470 of the process flow 400, computer-executable instructions stored on memory of the device may be executed to determine a first set of device identifiers associated with the second user account identifier, the first set of device identifiers comprising a second device identifier of a second device. For example, the remote server may determine a first set of device identifiers that is associated with the second user account identifier of the intended recipient. For example, the second user identifier may be associated with a smartphone device, a tablet device, a speaker device, and the like. The respective device identifiers of such devices may be determined. The second device identifier may be a device identifier of a smartphone.

At block 480 of the process flow 400, computer-executable instructions stored on memory of the device may be executed to send a first notification of the communication to the second device. For example, the remote server or another server may send a first notification of the communication, such as an alert, an audible notification, and/or another notification of the incoming communication to the second device, so that the intended recipient of the communication is notified of the communication. In some instances, the communication may be sent to the second device, such as instances where the communication is a text or voice message. In some embodiments, a notification may be sent to the accessory device instead of, and/or in addition to, the second device.

Figure 5:
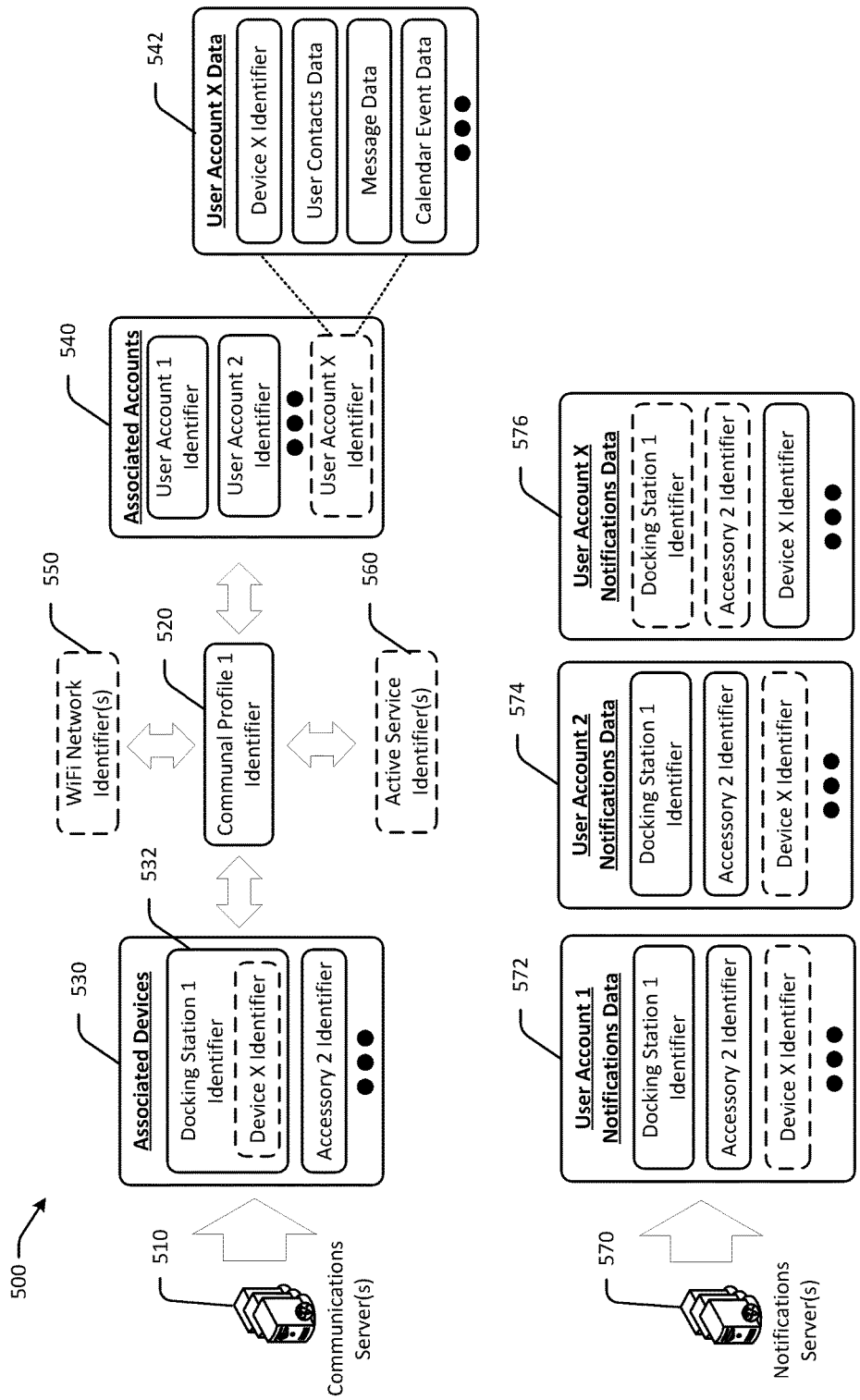
FIG. 5 is a schematic illustration of an example communications system and notifications system in accordance with one or more example embodiments of the disclosure.

FIG. 5 is a schematic illustration of an example system 500 that includes one or more communications servers 510 and one or more notifications system 500 in accordance with one or more example embodiments of the disclosure.

The communications server(s) 510 may be configured to facilitate one or more forms of communication between devices, such as synchronous and asynchronous communication sessions. The communications server(s) 510 may store data related to user account identifiers, device identifiers, and/or accessory device identifiers. For example, the communications server(s) 510 may store a communal profile identifier 520. The communal profile identifier 520 may be an identifier for a group of user accounts, such as a group of user accounts in a shared household or office, and the like. The communal profile identifier 520 may be associated with a number of devices 530.

The communications server(s) 510 may store associated device data 530 for devices that are associated with the communal profile identifier 520. For example, user devices associated with user accounts in the communal profile identifier 520 may be included in the associated device data 530. Example devices may include a mom's smartphone, a child's tablet, a communal speaker device, and so forth. In FIG. 5, the associated device data 530 may indicate that a docking station identifier 532 is associated with the communal profile 520, as well as an accessory device identifier. A device X may be coupled to the docking station, and as a result, the device X identifier may at least temporarily be associated with the communal profile 1 identifier 520. As illustrated in FIG. 5, the device X identifier may be associated with the docking station identifier, indicating that the device X is presently coupled to the docking station. The accessory device identifier may be associated with the communal profile identifier 520, along with other devices.

The communal profile identifier 520 may be associated with one or more user accounts, as illustrated with associated account data 540. The associated account data 540 may include one or more of the user accounts of users in the communal profile identifier 520. For example, the associated account data 540 may include a user account 1 identifier, a user account 2 identifier, and so forth. Such user account identifiers may be for static members of the communal profile or group (e.g., users that have the same shipping or billing address, etc.). As indicated by dashed lines in FIG. 5, some users may be added to the communal profile at least temporarily, such as when visiting a friend's house or office and coupling to an accessory device, etc. For example, a user account X identifier for a user that is not part of the static or predefined set of user account identifiers may be associated with the communal profile.

One or more, and/or each, of the user accounts associated with the communal profile, as indicated by the associated account data 540, may have additional data that is also associated with the communal profile. For example, for each of the associated user accounts, such as user account X, user-specific account data 542 may include device identifiers for devices associated with the user account, user contact data, historical message data (e.g., certain messages may be stored in cache memory of a communal device and can be accessed by the intended recipient, etc.), and/or calendar event. Users may have settings or privacy controls to limit the sharing of, and/or access to, any account specific information. Additional or fewer, and/or different, data may be included and/or associated with the communal profile identifier.

Optional WiFi network identifiers 550 may be associated with the communal profile identifier 520 and may be used to detect additional devices that are connected to the WiFi network identifiers and to optionally add detected devices to the communal profile, as well as any related user account identifiers.

Optional active service identifiers 560 may be associated with the communal profile identifier 520 and may be used to determine which services may be accessed using an associated device. For example, if the communal profile is associated with a premium music or movie subscription service, a device coupled to a second device associated with the communal profile may be used to access the premium subscription service, regardless of whether the coupled device is authorized for access or a user account associated with the device has subscribed to the service. In this manner, access to the subscription service may be shared while coupled to a device associated with the communal profile. In an example, the communications server(s) 510 may receive a request to access a service, and may determine that at least one user account identifier of the set of user account identifiers 540 is authorized to access the service, and may approve the request to access the service.

In some embodiments, devices may be associated or disassociated with a communal profile based at least in part on a connected WiFi network, a device location, and other factors or combinations of factors. For example, a first device or remote server may determine that a device is present in an ambient environment of the first device. A user account identifier associated with a device identifier of the device may be determined, and the user account identifier may be associated with the first device identifier, such that the set of user account identifiers 540 includes the user account identifier.

Accordingly, the communications server(s) 510 may be configured to determine contacts and devices of user accounts that are associated with the communal profile, and may manage the association or disassociation, such as the addition or removal, of user accounts and/or devices from a communal profile. Outgoing communications can therefore be directed to the correct recipient based at least in part on the connected user account data.

The notifications server(s) 570 may include data related to current associations between user account identifiers and device identifiers, so as to direct notifications of communications to the correct devices. For example, notification data for a first user account data 572 may indicate that notifications for the first user may be sent to a docking station identifier, an second identifier, and at least temporarily to a device X identifier because the device X is coupled to the docking station associated with the first user. As a result, the first user may receive notifications at device X while device X is coupled to the docking station. Second user account data 574 may indicate that the docking station identifier and the second identifier are also associated with the second user account, as well as the device X identifier, and therefore notifications for the second user may be sent to one or more, and/or all, of the associated devices. Third user account data 576 may indicate that the user can receive notifications at the docking station at least temporarily, as well as at the second device temporarily, and at the device X. For example, the third user may be visiting the home of the first and second user, and may therefore be at least temporarily associated with the communal profile and may receive notifications at the communal devices of the communal profile.

Figure 6:
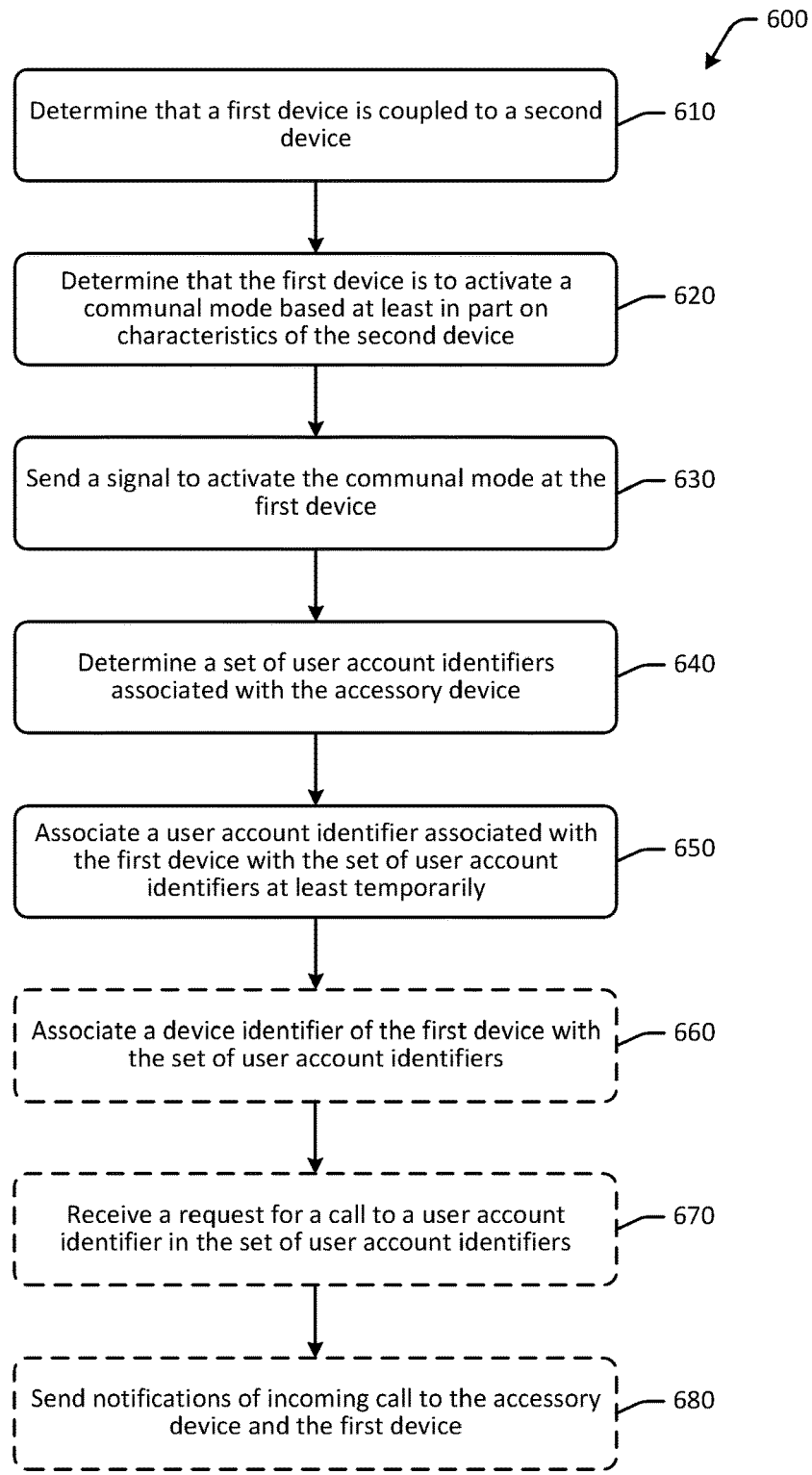
FIG. 6 is a schematic illustration of an example process flow for dynamic mode switching and management of communications between devices in accordance with one or more example embodiments of the disclosure.

FIG. 6 is a schematic illustration of an example process flow 600 for dynamic mode switching and management of communications between devices in accordance with one or more example embodiments of the disclosure. While example embodiments of the disclosure may be described in the context of personal and communal modes, and synchronous and asynchronous communication sessions, it should be appreciated that the disclosure is more broadly applicable to any mode available at a device. Some or all of the blocks of the process flows in this disclosure may be performed in a distributed manner across any number of devices. The operations of the process flow 600 may be optional and may be performed in a different order.

At block 610 of the process flow 600, it may be determined that a first device is coupled to an second device. For example, a remote server may determine that a smartphone device is wirelessly coupled to a speaker device, such as a smart speaker device. The remote server may determine that the first device, and/or in this example, the smartphone device, is coupled to the speaker device based at least in part on a notification from the speaker device and/or the smartphone device. Devices may be coupled to second devices physically or wirelessly.

At block 620, it may be determined that the first device is to activate a communal mode based at least in part on characteristics of the second device. For example, the remote server may determine that the speaker device is designated as a communal device, and as a result, devices coupled to the speaker device may be switched to a communal mode. Accordingly, the remote server may determine that the first device is to activate a communal mode. In other embodiments, the first device may locally determine that it is to activate a communal mode based at least in part on the coupling to the second device.

At block 630, a signal may be sent to activate the communal mode at the first device. For example, the remote server may determine that the first device is in a personal mode and may send a signal to activate the communal mode on the first device. The first device may receive the signal and may activate or implement the communal mode. In one example, activating the communal mode may cause a particular application or listener to become active, and may optionally deactivate another application or listener for the personal mode.

At block 640, a set of user account identifiers associated with the second device may be determined. For example, the second device may be associated with one or more predefined or not predefined user account identifiers. Predefined user account identifiers may be a set of user identifiers in a group, such as a family, co-workers, and the like, while not predefined user account identifiers may be a set of user account identifiers of users that are nearby the second device (and can therefore not be predefined or always predicted, as devices may come and go from proximity to the second device). In such instances, the currently associated set of user account identifiers that are associated with the second device may be determined by the remote server or another computer device.

At block 650, a user account identifier associated with the first device may be associated with the set of user account identifiers at least temporarily. For example, the user whose device is coupled to the second device may be added to or associated with the set of user accounts that is already associated with the second device. As a result, the user whose device is coupled to the second device may be able to use the communal second device to initiate and receive communications and notifications. The user account identifier may remain associated with the set of account identifiers while the device is coupled to the second device.

At optional block 660, a device identifier of the first device may be associated with the set of user account identifiers. For example, the remote server may determine a device identifier of the first device, and may associate the device identifier with the set of user account identifiers. As a result, communications and notifications intended for users in the set of user account identifiers may be sent to the first device while the first device is coupled to the second device.

At block 670, a request to initiate a synchronous communication session with a user in the set of user account identifiers may be received. For example, the remote server may receive a request to initiate a call with a user in the set of user account identifiers from a different user.

At block 680, notifications of the incoming synchronous communication session may be sent to the second device and the first device. For example, the remote server may determine that that first device is associated with the set of user account identifiers, and may send a first notification to the second device, and an optional second notification to the first device indicating that there is an incoming synchronous communication session for the user. As a result, the first device may be a communal device for both outgoing and incoming communications while coupled to the second device.

Figure 7:
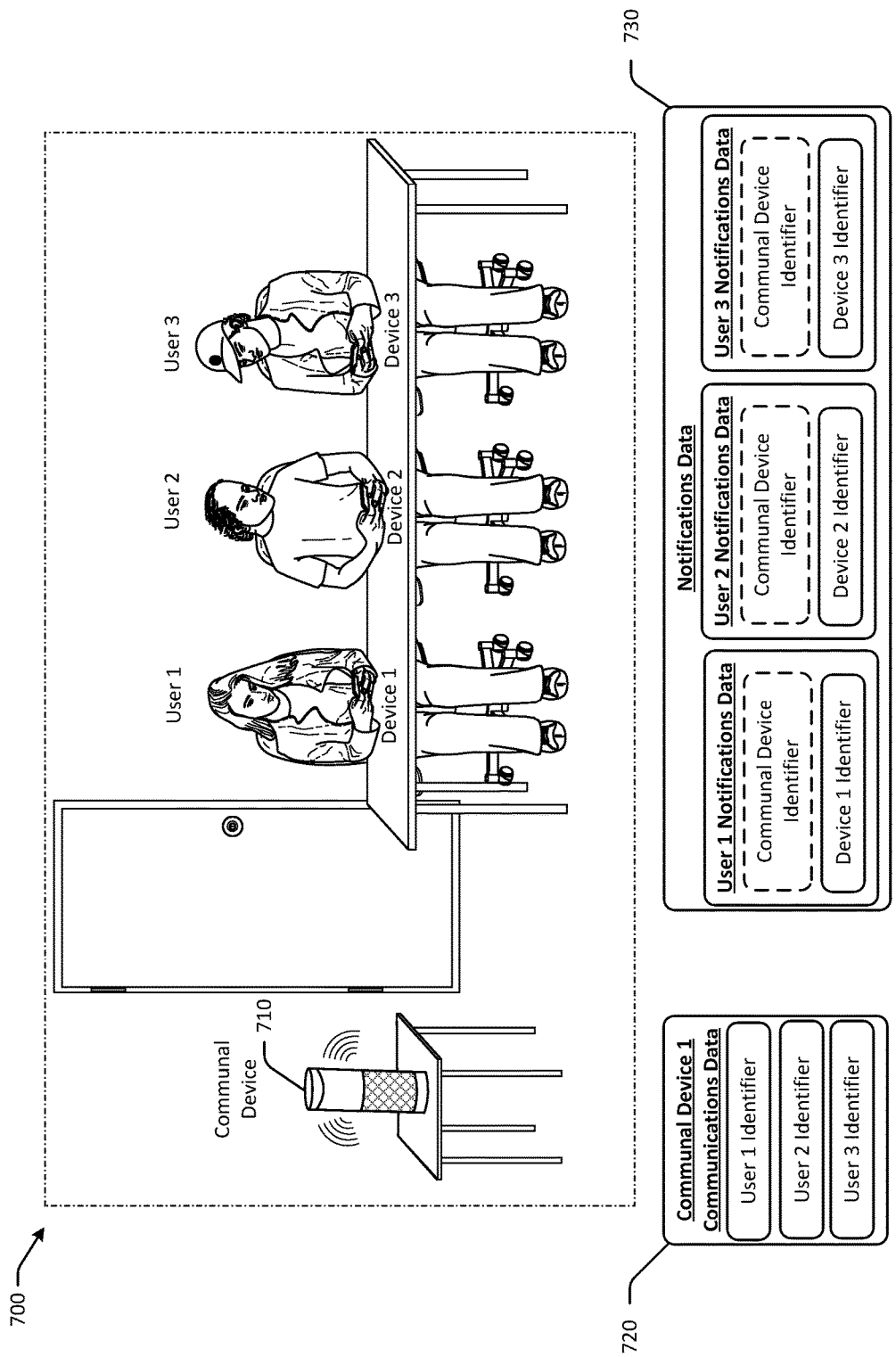
FIG. 7 is a schematic illustration of an example use case for management of communications between devices in a communal mode in accordance with one or more example embodiments of the disclosure.

FIG. 7 is a schematic illustration of an example use case 700 for management of communications between devices in a communal mode in accordance with one or more example embodiments of the disclosure. In FIG. 7, a communal device 710 may be located in a public environment where user account identifiers associated with nearby devices may be added to or associated with an active set of user account identifiers associated with the communal device 710. The communal device 710 may be a speaker device and may be configured to detect sound, such as voice inputs, using one or more microphones, and may be configured to output audio via one or more speakers. The communal device 710 may be a different type of device in different embodiments, and may or may not include a display. The communal device 710 may be located in a conference room in the illustrated example.

The communal device 710 may be in a communal mode with undefined user account identifiers. The communal device 710 may associate or disassociate user account identifiers based at least in part on detected user devices nearby, using a device identification technique such as one or more beacons, probes, requests, handshakes, and the like using any suitable communication protocol(s).

For example, there may be three users in proximity to the communal device 710. User 1, User 2, and User 3 may be seated at a table near the communal device 710. User 1 may be have a device 1 that is associated with a first device identifier and a first user identifier. User 2 may be have a device 2 that is associated with a second device identifier and a second user identifier. User 3 may be have a device 3 that is associated with a third device identifier and a third user identifier. One or more of the first device, the second device, and/or the third device may be detected by the communal device 710 using, for example, a beacon, the WiFi network, and/or other means of detection.

The communal device 710 may be wirelessly coupled to, such as wirelessly connected, one or more, and/or each, of the devices. Accordingly, the communal device 710 may have communications data 720 stored at a remote server, such as a communications server. The communications data 720 may include the first user identifier, the second user identifier, and the third user identifier, as illustrated in FIG. 7. As a result, communications or notifications intended for any of the first, second, and/or third users may be presented at the communal device 710. If a user leaves or a device is no longer determined to be in proximity to the communal device 710, the respective user identifier may be disassociated from the communications data 720. In one example, the user identifier may be removed from the communications data 720, while in another example, the user identifier may be switched from an active state to an inactive state at the communication data 720 for the communal device 710.

The communal device 710 may be associated with user identifiers in notifications data 730. The notifications data 730 may be stored at the same remote server or a different remote server, such as a notifications server. The notifications data 730 may indicate that the communal device 710 may be used for presentation of notifications to the user identifiers and/or device identifiers associated with the communal device 710 at a certain time.

For example, in FIG. 7, User 1 notifications data may indicate that notifications intended for User 1 can be sent to the communal device identifier (which may be a temporary association) and the device 1, which may be the device belonging to User 1. Similarly, User 2 notifications data may indicate that notifications intended for User 2 can be sent to the communal device identifier (which may be a temporary association) and the device 2, which may be the device belonging to User 2. The notifications data 730 may include User 3 notifications data indicating that notifications intended for User 3 can be sent to the communal device identifier (which may be a temporary association) and the device 3, which may be the device belonging to User 3.

Accordingly, notifications and/or communications intended for User 1, User 2, and User 3 may be sent to the communal device 710 in addition to, and/or instead of, each user's respective device.

For outgoing communications, the communal device 710 and connected systems may use a speaker identification process to determine an intended recipient of the communication, as well as to optionally tailor notifications to recipient user devices. For example, the communal device 710 may stream and/or send a portion of audio data and/or the audio signal to a remote server to determine whether a speaker of a voice input can be identified. Speaker identification may be determined based at least in part on a match between attributes of the voice of the speaker or user and a set of stored attributes representing a voice of a user, in order to determine whether the user is the same as the stored user.

To identify users, the remote server, and/or the device locally, may compare the audio data of the voice request, and/or attributes extracted from the audio data, to patterns of voices of users that are previously stored. Results of the comparison may be used to generate a confidence score that represents a likelihood or probability that the user making the voice request is the same as a previously stored user. The confidence score may be representative of a match between the requesting user's voice and the voice of a previously stored user in some embodiments. Based at least in part on the audio data and/or attributes of the user's voice as determined from the audio data or audio signal, a determination may be made that the user making the voice request is the same as a previously stored user. The audio data may be used to identify the speaker or user that said the verbal request or voice command, and the confidence score may be an indication of a likelihood that the user is actually the speaker identified.

Confidence scores may be determined by extracting or determining one or more attributes of a user's voice from the audio data, and comparing the results to a predetermined set of attributes of previously stored users' voices. Attributes may include pitch, patterns, cadence, accents, volume, and/or other attributes.

In some embodiments, a determination may be made as to whether the confidence score satisfies a threshold, such as a confidence score threshold. For example, after the confidence score is determined, the confidence score may be compared to a confidence score threshold to determine whether the confidence score is equal to or greater than the threshold. For example, the confidence score threshold may be 80, and a confidence score equal to or greater than 80 may satisfy the threshold. In some embodiments, the confidence score threshold may be dynamic and may change based at least in part on a number of user accounts associated with the communal device 710. For example, the greater the number of associated user account identifiers, the higher the threshold may be, whereas the lower the number of associated user account identifiers, the lower the threshold may be.

If the speaker of a voice input can be identified, the identified user's contact list may be prioritized over other contact lists, and the notification to the intended user may be personalized. For example, if the communal device 710 receives a request to call "Mom," while the three users are associated with the communal device 710, if User 2 is identified as the speaker of the request, the contact information for "Mom" as it appears in User's 2 contact list may be determined to be the intended recipient, even if User 1 and User 3 also have a "Mom" in their respective contact lists.

In instances where a contact name is found in only one contact list, a notification to the intended recipient may indicate that the communication is from the user account in which the contact name was identified. For example, a remote server may determine that a name is present in a first user's contact list, and a notification for a communication may indicate that the communication is from the first user, instead of any other users associated with the communal profile or a generic notification.

In instances where more a contact name is found in more than one contact list, certain determinations may be made to determine an intended recipient. For example, a likely speaker of the request may be determined, a priority of user accounts or contact lists may be considered, recent communication histories may be considered, and so forth.

In another example, notifications may indicate a particular user if the user can be identified based on the user's voice. For example, a remote server may determine a first probability value indicative of a likelihood that a voice input or user utterance was spoken by a particular user based at least in part on attributes of the audio data. In one example, a probability value may be determined by comparing extracted attributes of audio data to one or more sets of predetermined audio attributes that may be associated with individual user accounts. Based at least in part on results of the comparison, a match and/or partial match between the attributes of the captured audio data and the predetermined audio attributes may be determined and used to calculate a probability value. The first probability may be compared to a second probability value indicative of a likelihood that the voice input or user utterance was spoken by another associated user, and the higher probability value may be determined to be the user making the request. In other embodiments, the probability values may be compared to a confidence threshold to determine whether the probability value has a minimum level of accuracy.

Figure 8:
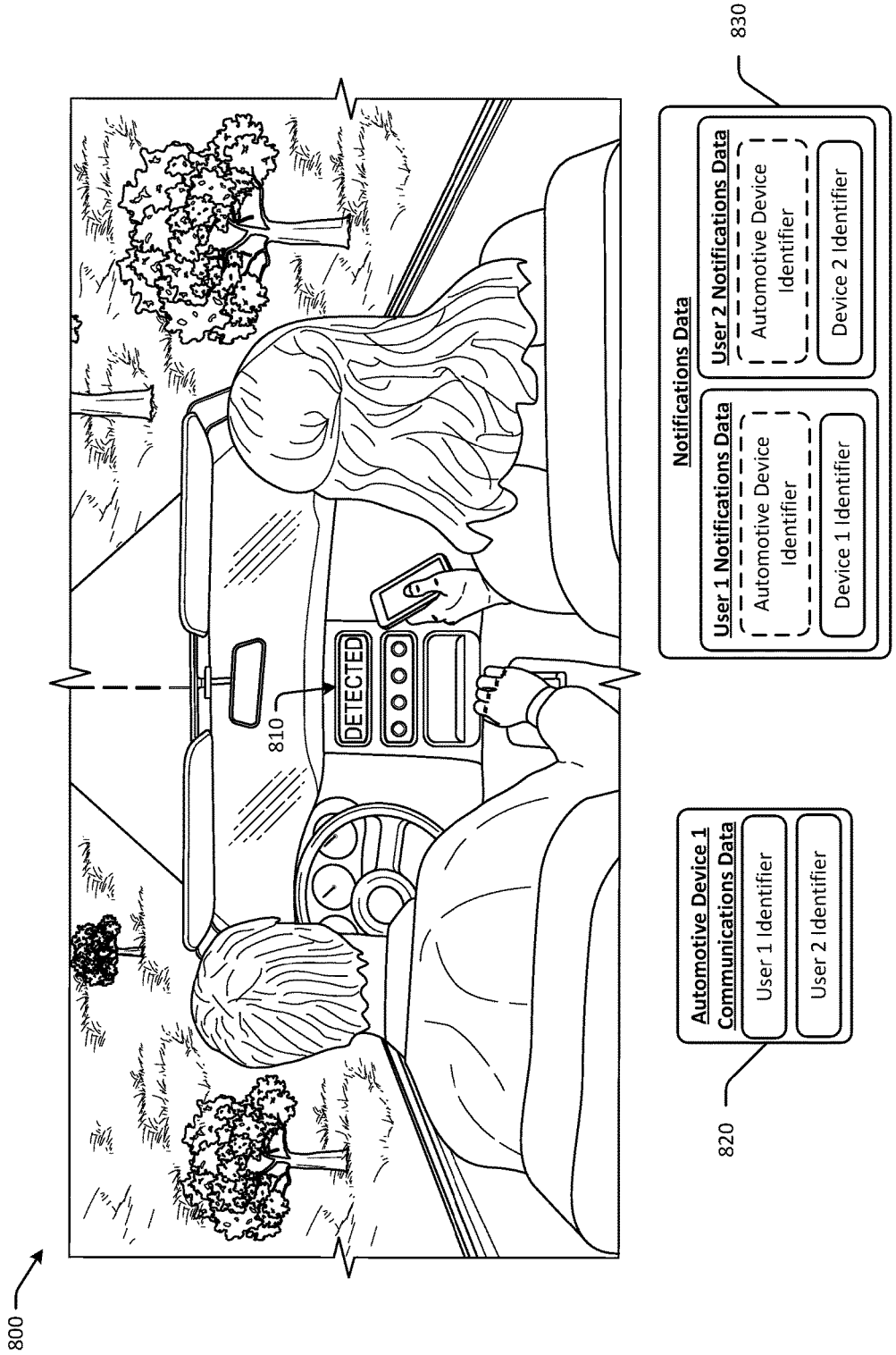
FIG. 8 is a schematic illustration of an example use case for dynamic mode switching and management of communications between devices in a mobile environment in accordance with one or more example embodiments of the disclosure.

FIG. 8 is a schematic illustration of an example use case 800 for dynamic mode switching and management of communications between devices in a mobile environment in accordance with one or more example embodiments of the disclosure. In FIG. 8, an second device 810 may be coupled to a mobile environment, such as a vehicle. In some instances, the vehicle may be the accessory device or may have an electronic component, such as a display or entertainment system, that is an accessory device.

In some embodiments, the accessory device 810 may detect nearby devices, such as a device for a first user driving the car and a second user in the passenger seat. In other embodiments, respective calendars of the users may be used to determine that the users are in the vehicle together (or in a conference room together, and/or another common location, etc.), and that the respective user identifiers should be associated with the second device 810 during a calendar event. For example, both the first user and the second user may have accepted a calendar invite for a road trip to a certain destination. Because the user identifiers of both users indicate that the users have accepted the invite, one or more remote servers may determine that the user identifiers are to be associated with the automotive device accessory or second device 810. As illustrated in FIG. 8, the automotive device 1 communications data may be modified to associate the first user identifier and the second user identifier with the second device. The respective contact lists, previous messages, and other optional data may therefore be associated with the second device and can be used for communications and notifications. Notifications data 830 may be updated to indicate that the first user identifier may receive notifications at the automotive device accessory or second device 810, as well as the user's device, and the second user identifier may receive notifications at the automotive device accessory or second device 810, as well as the user's device. As a result, both users that are passengers in the automobile may receive notifications at the vehicle accessory device or second device 810. The association may remain until the end of the calendar event, and/or until the vehicle is no longer in motion, as determined using one or more sensors of the respective user devices.

In an embodiment, a calendar event associated with the first user account identifier may be determined. A second user account identifier associated with the calendar event may be determined, such as an organizer of the calendar invite, an acceptor of an invite, and so forth. One or more remote servers may determine that the calendar event is presently occurring, and the first and second user account identifiers may be associated with the accessory device in the automobile or other accessory device.

One or more operations of the methods, process flows, and/or use cases of FIGS. 1-8 may have been described above as being performed by a user device, and/or more specifically, by one or more program component(s), applications, and/or the like executing on a device. It should be appreciated, however, that any of the operations of the methods, process flows, and/or use cases of FIGS. 1-8 may be performed, at least in part, in a distributed manner by one or more other devices, and/or more specifically, by one or more program component(s), applications, and/or the like executing on such devices. In addition, it should be appreciated that the processing performed in response to the execution of computer-executable instructions provided as part of an application, program component, and/or the like may be interchangeably described herein as being performed by the application or the program component itself or by a device on which the application, program component, and/or the like is executing. While the operations of the methods, process flows, and/or use cases of FIGS. 1-8 may be described in the context of the illustrative devices, it should be appreciated that such operations may be implemented in connection with numerous other device configurations.

The operations described and depicted in the illustrative methods, process flows, and use cases of FIGS. 1-8 may be carried out or performed in any suitable order as desired in various example embodiments of the disclosure. Additionally, in certain example embodiments, at least a portion of the operations may be carried out in parallel. Furthermore, in certain example embodiments, less, more, and/or different operations than those depicted in FIGS. 1-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, and/or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, and/or combinations of special-purpose hardware and computer instructions.

Illustrative Device Architecture

Figure 9:
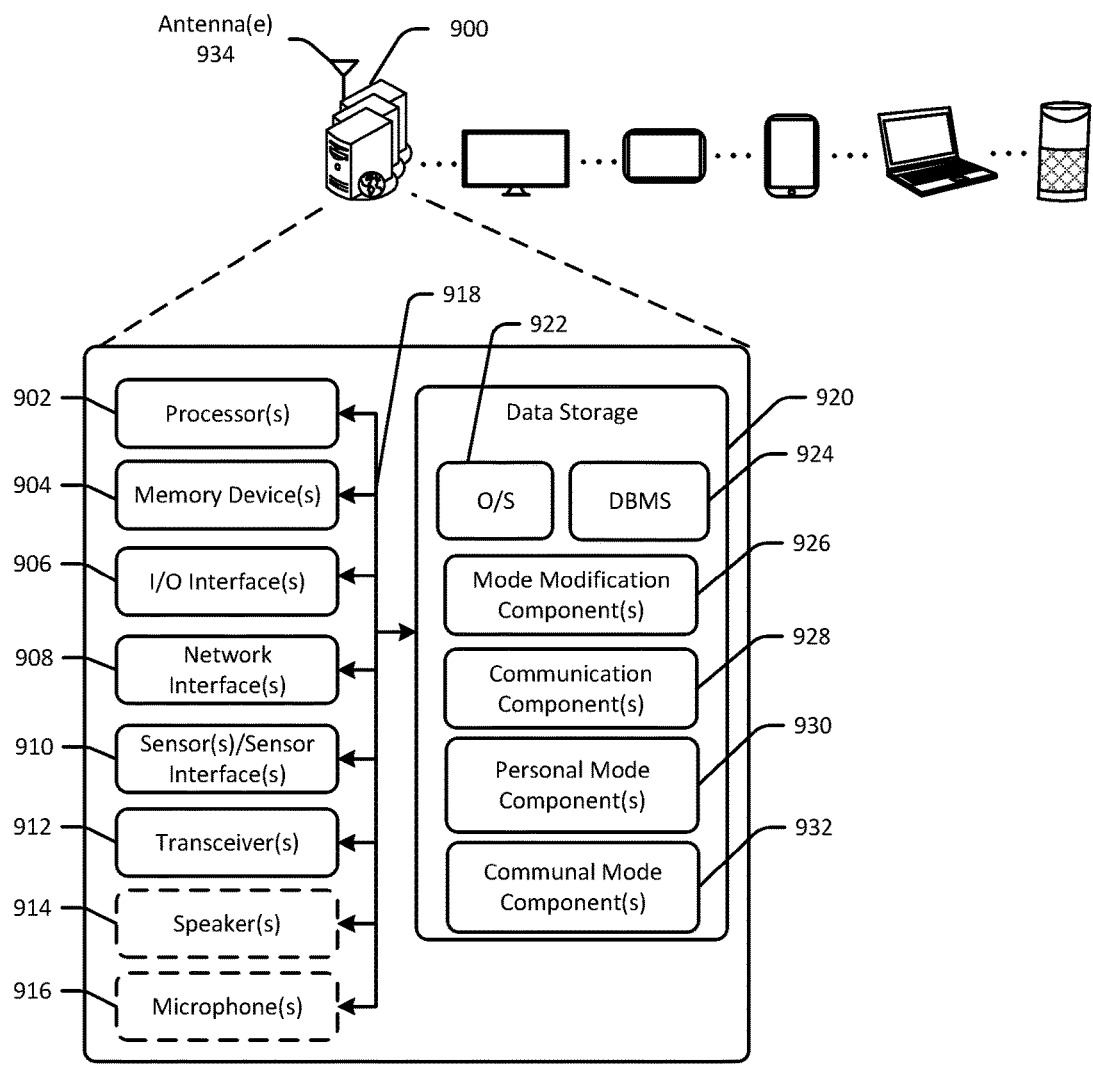
FIG. 9 is a schematic block diagram of an illustrative device in accordance with one or more example embodiments of the disclosure.

FIG. 9 is a schematic block diagram of an illustrative device 900 in accordance with one or more example embodiments of the disclosure. The device 900 may include any suitable computing device capable of receiving and/or generating data including, but not limited to, a mobile device such as a smartphone, tablet, e-reader, wearable device, and/or the like; a desktop computer; a laptop computer; a content streaming device; a set-top box; or the like. The device 900 may correspond to an illustrative device configuration for the devices of FIGS. 1-8.

The device 900 may be configured to communicate via one or more networks with one or more servers, search engines, user devices, and/or the like. In some embodiments, a single device or single group of devices may be configured to perform more than one type of device operating mode management functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The communications system may interface with the speech processing system, in one example, through a communications speechlet incorporated in the speech processing system. To initiate a communication session, in one example, the device 900 is configured to enable voice commands (e.g., perform ASR, NLU, etc. to identify a spoken command included in audio data), whereas a communications server(s) is configured to enable communication sessions (e.g., using session initiation protocol (SIP)). For example, the communications server(s) may send SIP messages to endpoints (e.g., recipient devices) in order to establish a communication session for sending and receiving audio data and/or video data. The communication session may use network protocols such as real-time transport protocol (RTP), RTP Control Protocol (RTCP), Web Real-Time communication (WebRTC), and/or the like. For example, the communications server(s) may send SIP messages to initiate a single RTP media stream between two endpoints (e.g., direct RTP media stream between an originating device and a recipient device) and/or to initiate and facilitate RTP media connections between the two endpoints (e.g., RTP media streams between the originating device and the communications server(s) and between the communications server(s) and a recipient device). During a communication session, the communications server(s) may initiate two media streams, with a first media stream corresponding to audio data sent from the originating device and to the recipient device and a second media stream corresponding to audio data sent from the recipient device and to the originating device.

In some embodiments, the originating device may send audio data to the device 900 and the device 900 may determine call information using the audio data and may send the call information to the communications server(s) (e.g., via a communications speechlet). The device 900 may determine the call information by performing ASR, NLU, etc., as discussed herein, and the call information may include a data source name (DSN), a number from which to call, a number to which to call, encodings, and/or additional information. For example, the device 900 may identify from which phone number the originating user would like to initiate the call, to which phone number the originating user would like to initiate the call, from which device the originating user would like to perform the call, etc.

In other embodiments, the device 900 may send the call information to the originating device and the originating device may send the call information to the communications server(s) in order to initiate the call without departing from the present disclosure. Thus, the device 900 may not communicate directly with the communications server(s), or may instead instruct the originating device to communicate with the communications server(s) in order to initiate the call.

The communications server(s) may include an outbound SIP translator, an inbound SIP translator, and a call state database. The outbound SIP translator may include logic to convert commands received from the device 900 into SIP requests/responses and may handle sending outgoing SIP requests and sending responses to incoming SIP requests. After receiving the call information, the outbound SIP translator may persist a SIP dialog using the call state database. For example, the DSN may include information such as the name, location, and driver associated with the call state database (and, in some examples, a user identifier and password of the originating user) and the outbound SIP translator may send a SIP dialog to the call state database regarding the communication session. The call state database may persist the call state if provided a device identifier and one of a call identifier or a dialog identifier. The outbound SIP translator may send a SIP Invite to a SIP Endpoint (e.g., a recipient device, a Session Border Controller (SBC), or the like). While one SIP Endpoint is illustrated, one skilled in the art will appreciate that SIP invites may be sent to more than one SIP Endpoint (e.g., all devices associated with a same restricted user).

The inbound SIP translator may include logic to convert SIP requests/responses into commands to send to the device 900 and may handle receiving incoming SIP requests and incoming SIP responses. The SIP endpoint may send a TRYING message to the inbound SIP translator and may send a RINGING message to the inbound SIP translator. The inbound SIP translator may update the SIP dialog using the call state database and may send a RINGING message to the device 900, which may send the RINGING message to the originating device. Alternatively, the inbound SIP translator may send the RINGING message to the originating device without using the device 900 as an intermediary.

When the communication session is accepted by the SIP endpoint, the SIP endpoint may send a OK message to the inbound SIP translator, the inbound SIP translator may send a startSending message to the device 900, and the device 900 may send the startSending message to the originating device. Alternatively, the inbound SIP translator may send the startSending message to the originating device without using the device 900 as an intermediary. The startSending message may include information associated with an internet protocol (IP) address, a port, encoding, or the like required to initiate the communication session. Using the startSending message, the originating device may establish an RTP communication session with the SIP endpoint via the communications server(s). The RTP session may be referred to as direct audio communication functionality as speech captured by one device of the RTP session may be sent as audio data to another device of the RTP session, which outputs the speech to a recipient user.

Other embodiments may use any communication protocol for signaling and/or controlling communication sessions without departing from the disclosure. Similarly, while some descriptions of the communication sessions refer only to audio data, the disclosure is not limited thereto and the communication sessions may include audio data, video data, and/or any other multimedia data without departing from the disclosure.

Signaling to end a communication session may include, after establishing the RTP communication session between the originating device and the SIP endpoint, the RTP communication session may be ended by the originating user inputting a command, to end the call, to the originating device, or a recipient user inputting a command, to end the call, to the SIP endpoint.

The originating device may send a state change message to the device 900 and the device 900 may send an end message to the communications server(s). The outbound SIP translator may update the session using the call state database and may send a SIP BYE message to the SIP endpoint. The SIP endpoint may send an OK message to the inbound SIP translator and the inbound SIP translator may update the session using the call state database. In some examples, the inbound SIP translator may send the OK message to the originating device to confirm the communication session has been ended. Thus, the RTP communication session may be ended between the originating device and the SIP endpoint.

The SIP endpoint may send a SIP BYE message to the inbound SIP translator and the inbound SIP translator may update the session using the call state database. The inbound SIP translator may send a stopSending message to the device 900 and the device 900 may send the stopSending message to the originating device. The originating device may send a state change message to the device 900 and the device 900 may send an End message to the outbound SIP translator, the End message including a DSN. The outbound SIP translator may then update the session using the call state database, and send an OK message to the SIP endpoint. Thus, the RTP communication session may be ended between the originating device and the SIP endpoint 750.

In some embodiments, the device 900 may act as an intermediary between the originating device and the communications server(s), while in other embodiments the originating device may send the state change message and/or the End message to the communications server(s) without using the device 900 as an intermediary.

In some embodiments, the RTP communication session being established between the originating device and the SIP endpoint, the present disclosure is not limited thereto and the RTP communication session may be established between the originating device and a telephone network associated with the SIP endpoint without departing from the present disclosure.

To establish media connections between devices, in some examples, the originating device may have a publicly accessible IP address and may be configured to establish the RTP communication session directly with the SIP endpoint. To enable the originating device to establish the RTP communication session, the communications server(s) may include Session Traversal of User Datagram Protocol (UDP) Through Network Address Translators (NATs) server(s) (e.g., STUN server(s)). The STUN server(s) may be configured to allow NAT clients (e.g., an originating device behind a firewall) to setup calls to a VoIP provider hosted outside of the local network by providing a public IP address, the type of NAT they are behind, and a port identifier associated by the NAT with a particular local port. The originating device may perform IP discovery using the STUN server(s) and may use this information to set up an RTP communication session (e.g., UDP communication) between the originating device and the SIP endpoint to establish a call.

In some examples, the originating device may not have a publicly accessible IP address. For example, in some types of NAT the originating device cannot route outside of the local network. To enable the originating device to establish an RTP communication session, the communications server(s) may include Traversal Using relays around NAT (TURN) server(s). The TURN server(s) may be configured to connect the originating device to the SIP endpoint when the originating device is behind a NAT. The originating device may establish an RTP session with the TURN server(s) and the TURN server(s) may establish an RTP session with the SIP endpoint. Thus, the originating device may communicate with the SIP endpoint via the TURN server(s). For example, the originating device may send audio data to the communications server(s) and the communications server(s) may send the audio data to the SIP endpoint. Similarly, the SIP endpoint may send audio data to the communications server(s) and the communications server(s) may send the audio data to the originating device.

In some examples, the system may establish communication sessions using a combination of the STUN server(s) and the TURN server(s). For example, a communication session may be more easily established/configured using the TURN server(s), but may benefit from latency improvements using the STUN server(s). Thus, the system may use the STUN server(s) when the communication session may be routed directly between two devices and may use the TURN server(s) for all other communication sessions. Additionally or alternatively, the system may use the STUN server(s) and/or the TURN server(s) selectively based on the communication session being established. For example, the system may use the STUN server(s) when establishing a communication session between two devices (e.g., point-to-point) within a single network (e.g., corporate LAN and/or WLAN), but may use the TURN server(s) when establishing a communication session between two devices on separate networks and/or three or more devices regardless of network(s). When the communication session goes from only two devices to three or more devices, the system may need to transition from the STUN server(s) to the TURN server(s). Thus, if the system anticipates three or more devices being included in the communication session, the communication session may be performed using the TURN server(s). When the communication session goes from three or more devices to only two devices, the system may need to transition from the TURN server(s) to the STUN server(s).

In an illustrative configuration, the device 900 may include one or more processors (processor(s)) 902, one or more memory devices 904 (generically referred to herein as memory 904), one or more input/output (I/O) interface(s) 906, one or more network interface(s) 908, one or more sensors or sensor interface(s) 910, one or more transceivers 912, one or more optional speakers 914, one or more optional microphones 916, and data storage 920. The device 900 may further include one or more buses 918 that functionally couple various components of the device 900. The device 900 may further include one or more antenna(e) 934 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, memory bus, an address bus, or a message bus, and may permit exchange of information (e.g., data (including computer-executable code), signaling, etc.) between various components of the device 900. The bus(es) 918 may include, without limitation, a memory bus or a memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 904 of the device 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to memory 904 for use by the processor(s) 902 during the execution of the computer-executable instructions. Moreover, output data generated as a result of execution of the computer-executable instructions by the processor(s) 902 may be stored initially in memory 904, and may ultimately be copied to data storage 920 for non-volatile storage.

More specifically, the data storage 920 may store one or more operating systems (O/S) 922; one or more database management systems (DBMS) 924; and one or more program component(s), applications, engines, computer-executable code, scripts, or the like such as, for example, one or more mode modification component(s) 926, one or more communication component(s) 928, one or more personal mode component(s) 930, and/or one or more communal mode component(s) 932. Some or all of these component(s) may be sub-component(s). Any of the components depicted as being stored in data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in data storage 920 may support functionality described in reference to correspondingly named components earlier in this disclosure.

The data storage 920 may further store various types of data utilized by components of the device 900. Any data stored in the data storage 920 may be loaded into the memory 904 for use by the processor(s) 902 in executing computer-executable code. In addition, any data depicted as being stored in the data storage 920 may potentially be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 9, the datastore(s) may include, for example, operating mode settings for various applications, authorized speaker or user data, user identifiers associated with certain devices, location identifiers associated with certain user identifiers and/or device identifiers, docked operating mode settings, and other information. The datastore(s) may include communal account identifiers and associated personal account identifiers for users that are associated with the communal account identifier.

The processor(s) 902 may be configured to access the memory 904 and execute computer-executable instructions loaded therein. For example, the processor(s) 902 may be configured to execute computer-executable instructions of the various program component(s), applications, engines, or the like of the device 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to functionality supported by the various program component(s) depicted in FIG. 9, the mode modification component(s) 926 may include computer-executable instructions, code, or the like that responsive to execution by one or more of the processor(s) 902 may perform functions including, but not limited to, determining whether to listen for events using a personal mode application or a communal mode application, determining whether a personal mode or communal mode should be activated, detecting connections or coupling to a device, such as a docking station, automatically switching between communication modes, detecting user devices, and the like.

The communication component(s) 928 may include computer-executable instructions, code, or the like that responsive to execution by one or more of the processor(s) 902 may perform functions including, but not limited to, communicating with one or more devices, for example, via wired or wireless communication, communicating with remote servers, communicating with remote datastores, sending or receiving audio data, communicating with cache memory data, and the like.

The personal mode component(s) 930 may include computer-executable instructions, code, or the like that responsive to execution by one or more of the processor(s) 902 may perform functions including, but not limited to, determining an active or current device operating mode, causing changes to device operating modes, canceling or deferring automatic changes to device operating modes, determining voice commands or voice inputs, cause or initiate messages and/or synchronous communication sessions, identify users, initiate wireless communications, and the like.

The communal mode component(s) 932 may include computer-executable instructions, code, or the like that responsive to execution by one or more of the processor(s) 902 may perform functions including, but not limited to, determining audio data or voice commands, identifying speakers of voice inputs, determining confidence scores, comparing attributes of voice input to stored data, initiating wireless communications, listening for events, detecting devices, determining locations, and the like.

Referring now to other illustrative components depicted as being stored in the data storage 920, the O/S 922 may be loaded from the data storage 920 into the memory 904 and may provide an interface between other application software executing on the device 900 and hardware resources of the device 900. More specifically, the O/S 922 may include a set of computer-executable instructions for managing hardware resources of the device 900 and for providing common services to other application programs (e.g., managing memory allocation among various application programs). In certain example embodiments, the O/S 922 may control execution of the other program component(s) to dynamically enhance characters for content rendering. The O/S 922 may include any operating system now known or which may be developed in the future including, but not limited to, any server operating system, any mainframe operating system, or any other proprietary or non-proprietary operating system.

The DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the device 900 is a mobile device, the DBMS 924 may be any suitable light-weight DBMS optimized for performance on a mobile device.

Referring now to other illustrative components of the device 900, the input/output (I/O) interface(s) 906 may facilitate the receipt of input information by the device 900 from one or more I/O devices as well as the output of information from the device 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 900 or may be separate. The I/O devices may further include, for example, any number of peripheral devices such as data storage devices, printing devices, and so forth.

The I/O interface(s) 906 may also include an interface for an external peripheral device connection such as universal serial bus (USB), FireWire, Thunderbolt, Ethernet port or other connection protocol that may connect to one or more networks. The I/O interface(s) 906 may also include a connection to one or more of the antenna(e) 934 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The device 900 may further include one or more network interface(s) 908 via which the device 900 may communicate with any of a variety of other systems, platforms, networks, devices, and so forth. The network interface(s) 908 may enable communication, for example, with one or more wireless routers, one or more host servers, one or more web servers, and the like via one or more of networks.

The antenna(e) 934 may include any suitable type of antenna depending, for example, on the communications protocols used to transmit or receive signals via the antenna (e) 934. Non-limiting examples of suitable antennas may include directional antennas, non-directional antennas, dipole antennas, folded dipole antennas, patch antennas, multiple-input multiple-output (MIMO) antennas, or the like. The antenna(e) 934 may be communicatively coupled to one or more transceivers 912 or radio components to which or from which signals may be transmitted or received.

As previously described, the antenna(e) 934 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 934 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 934 may be configured to transmit or receive radio frequency signals within any suitable frequency range forming part of the unlicensed portion of the radio spectrum.

The antenna(e) 934 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(e) 934—transmitting or receiving radio frequency (RF) signals in the bandwidth and/or channels corresponding to the communications protocols utilized by the device 900 to communicate with other devices. The transceiver(s) 912 may include hardware, software, and/or firmware for modulating, transmitting, or receiving—potentially in cooperation with any of antenna(e) 934—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the device 900. The transceiver(s) 912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 914 may be any device configured to generate audible sound. The optional microphone(s) 916 may be any device configured to receive analog sound input or audio data.

It should be appreciated that the program component(s), applications, computer-executable instructions, code, or the like depicted in FIG. 9 as being stored in the data storage 920 are merely illustrative and not exhaustive and that processing described as being supported by any particular component may alternatively be distributed across multiple component(s) or performed by a different component. In addition, various program component(s), script(s), plug-in(s), Application Programming Interface(s) (API(s)), or any other suitable computer-executable code hosted locally on the device 900, and/or hosted on other computing device(s) accessible via one or more networks, may be provided to support functionality provided by the program component(s), applications, or computer-executable code depicted in FIG. 9 and/or additional or alternate functionality. Further, functionality may be modularized differently such that processing described as being supported collectively by the collection of program component(s) depicted in FIG. 9 may be performed by a fewer or greater number of component(s), or functionality described as being supported by any particular component may be supported, at least in part, by another component. In addition, program component(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program component(s) depicted in FIG. 9 may be implemented, at least partially, in hardware and/or firmware across any number of devices.

It should further be appreciated that the device 900 may include alternate and/or additional hardware, software, or firmware components beyond those described or depicted without departing from the scope of the disclosure. More particularly, it should be appreciated that software, firmware, or hardware components depicted as forming part of the device 900 are merely illustrative and that some components may not be present or additional components may be provided in various embodiments. While various illustrative program component(s) have been depicted and described as software component(s) stored in data storage 920, it should be appreciated that functionality described as being supported by the program component(s) may be enabled by any combination of hardware, software, and/or firmware. It should further be appreciated that each of the above-mentioned component(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular component may, in various embodiments, be provided at least in part by one or more other component(s). Further, one or more depicted component(s) may not be present in certain embodiments, while in other embodiments, additional component(s) not depicted may be present and may support at least a portion of the described functionality and/or additional functionality. Moreover, while certain component(s) may be depicted and described as sub-component(s) of another component, in certain embodiments, such component(s) may be provided as independent component(s) or as sub-component(s) of other component(s).

Figure 10:
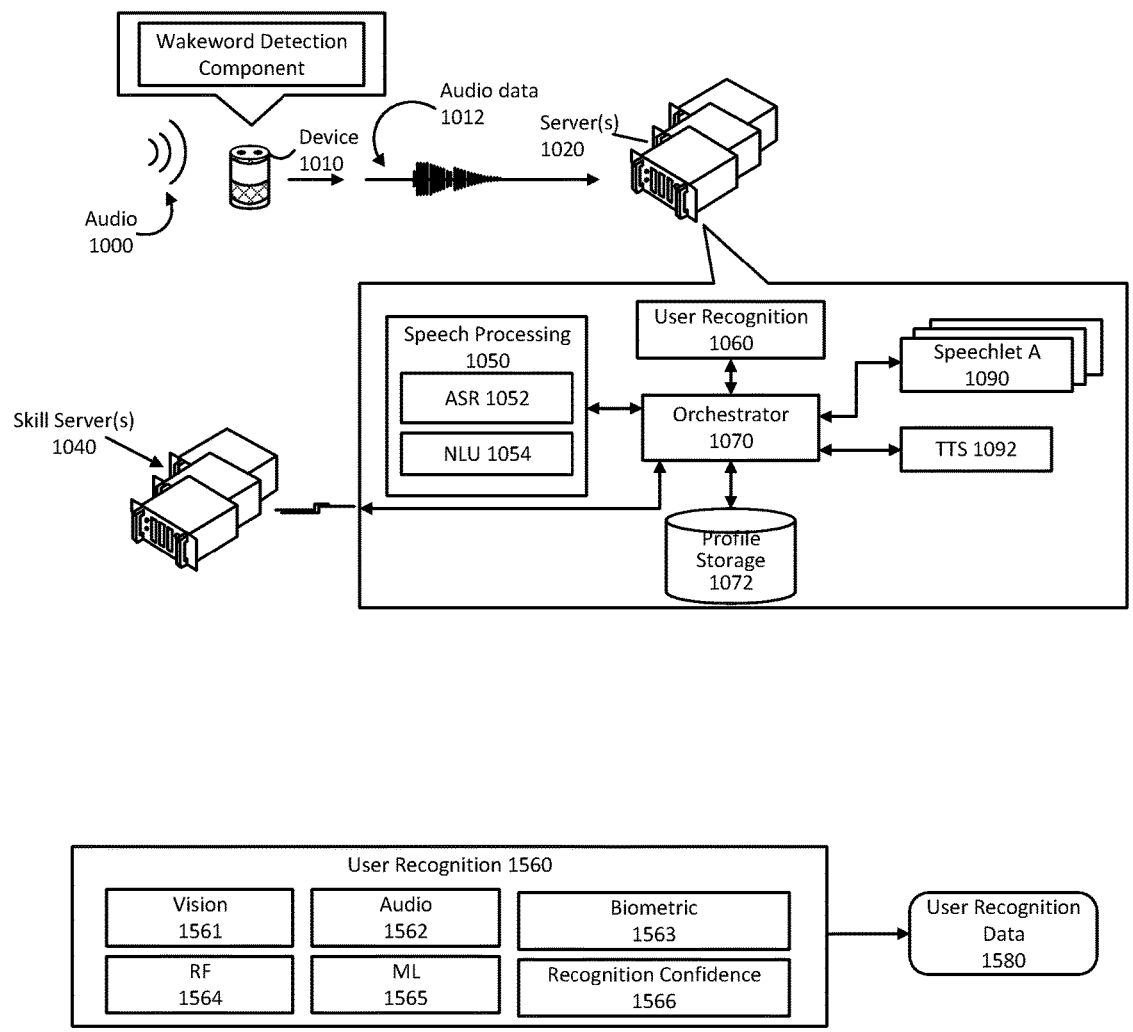
FIG. 10 is a schematic block diagram of components of a system in accordance with one or more example embodiments of the disclosure.

The system may operate using various components as described in FIG. 10. The various components illustrated FIG. 10 may be located on the same or different physical devices. Communication between various components illustrated in FIG. 10 may occur directly or across one or more network(s). The system of FIG. 10 may include one or more server(s) 1020 and one or more skill server(s) 1040 that may be in communication using one or more networks.

A device 1010 captures audio 1000 using an audio capture component, such as a microphone or array of microphones. The device 1010, using a wakeword detection component 1030, processes audio data corresponding to the audio 1000 to determine if a keyword (e.g., a wakeword) is detected in the audio data. Following detection of a wakeword, the device 1010 sends audio data 1012, corresponding to the audio 1000, to the one or more server(s) 1020.

Upon receipt by the server(s) 1020, the audio data 1012 may be sent to an orchestrator component 1070. The orchestrator component 1070 may include memory and logic that enables the orchestrator component 1070 to transmit various pieces and forms of data to various components of the system.

The orchestrator component 1070 sends the audio data 1012 to a speech processing component 1050. An ASR component 1052 of the speech processing component 1050 transcribes the audio data 1012 into one or more textual interpretations representing speech contained in the audio data 1012. The ASR component 1052 interprets the spoken utterance based on a similarity between the spoken utterance and pre-established language models. For example, the ASR component 1052 may compare the audio data 1012 with models for sounds (e.g., subword units such as phonemes) and sequences of sounds to identify words that match the sequence of sounds spoken in the utterance represented in the audio data 1012. The ASR component 1052 sends text data generated thereby to an NLU component 1054 of the speech processing component 1050. The text data sent from the ASR component 1052 to the NLU component 1054 may include a top scoring textual interpretation of the audio data 1012 or may include an N-best list including a group of textual interpretations of the audio data 1012, and potentially their respective scores.

The NLU component 1054 attempts to make a semantic interpretation of the phrases or statements represented in the text data input therein. That is, the NLU component 1054 determines one or more meanings associated with the phrases or statements represented in the text data based on individual words represented in the text data. The NLU component 1054 interprets a text string to derive an intent of the user (e.g., an action that the user desires be performed) as well as pertinent pieces of information in the text data that allow a device (e.g., the device 1010, the server(s) 1020, the skill server(s) 1040, etc.) to complete the intent. For example, if the text data corresponds to "play music," the NLU component 1054 may determine the user intended music to be output from one or more devices.

The server(s) 1020 may include a user recognition component 1060. The user recognition component 1060 may determine user that most likely spoke an input utterance as explained below.

The server(s) 1020 may include a profile storage 1072. The profile storage 1072 may include a variety of information related to individual devices, groups of devices, individual users, groups of users, etc. that interact with the system as described below.

The orchestrator component 1070 may send output from the NLU component 1054 (e.g., text data including tags attributing meaning to the words and phrases represented in the text data), and optionally output from the user recognition component 1060 and/or data from the profile storage 1072, to one or more speechlets 1090 and/or the one or more skill servers 1040 implementing one or more skills.

A "speechlet" may be software running on the server(s) 1020 that is akin to a software application running on a traditional desktop computer. That is, a speechlet 1090 may enable the server(s) 1020 to execute specific functionality in order to provide data or produce some other output requested by a user. The server(s) 1020 may be configured with more than one speechlet 1090. For example, a weather service speechlet may enable the server(s) 1020 to provide weather information, a car service speechlet may enable the server(s) 1020 to book a trip with respect to a taxi or ride sharing service, an order pizza speechlet may enable the server(s) 1020 to order a pizza with respect to a restaurant's online ordering system, etc. A speechlet may operate in conjunction between the server(s) 1020 and other devices such as a local device 1010 in order to complete certain functions. Inputs to the speechlet may come from speech processing interactions or through other interactions or input sources. In some embodiments, speechlets may send signals or data to client devices that cause the client device to activate a voice-forward operating mode or a tablet operating mode. A current operating mode of a client device may be stored at the server 1020. In some embodiments, a tablet-management speechlet may be included and may send a directive or command to a client device, such as a tablet, that causes the device to activate or switch into certain operating modes.

A speechlet may include a "skill." A skill may be software running on a skill server(s) 1040 that is akin to an application. That is, a skill may enable the skill server(s) 1040 to execute specific functionality in order to provide data or produce some other output requested by a user. A skill server(s) 1040 may be configured with more than one skill. For example, a weather service skill may enable the skill server(s) 1040 to provide weather information to the server(s) 1040, a car service skill may enable the skill server(s) 1040 to book a trip with respect to a taxi or ride sharing service, an order pizza skill may enable the skill server(s) 1040 to order a pizza with respect to a restaurant's online ordering system, etc. A skill may operate in conjunction between the skill server(s) 1040 and other devices such as the server(s) 1040 or local device in order to complete certain functions. Inputs to the skill may come from speech processing interactions or through other interactions or input sources. Skills may be associated with certain client devices while the client device is in a voice-forward mode. For example, while in a voice-forward mode, a client device may be associated with a music skill that can be used to cause playback of music using voice commands received at the client device.

The functions provided by one or more speechlets 1090 may overlap or be different from the functions provided by one or more skills. Speechlets 1090 may be implemented in some combination of hardware, software, firmware, etc.

The orchestrator component 1070 may choose which speechlet(s) 1090 and/or skill server(s) 1040 to send data to based on the output of the NLU component 1054. In an example, the orchestrator component 1070 may send data to a music playing speechlet(s) 1090 and/or skill server(s) 1040 when the NLU component 1054 outputs text data associated with a command to play music. In another example, the orchestrator component 1070 may send data to a weather speech(s) 1090 and/or skill server(s) 1040 when the NLU component 1054 outputs text data associated with a command to output weather information. In yet another example, the orchestrator component 1070 may send data to a search engine speechlet(s) 1090 and/or skill server(s) 1040 when the NLU component 1054 outputs text data associated with a command to obtain search results.

Speechlets 1090 and skill servers 1040 may output text data, which the orchestrator component 1070 may send to a text-to-speech (TTS) component 1092. The TTS component 1092 may synthesize speech corresponding to the text data input therein. The orchestrator component 1070 or other component of the server(s) 1040 may send audio data synthesized by the TTS component 1092 (or other output data from speechlet(s) 1090 or skill server(s) 1040) to the device 1010 (or another device including a speaker and associated with the same user ID or customer ID) for output to one or more users.

The TTS component 1092 may perform speech synthesis using one or more different methods. In one method of synthesis called unit selection, the TTS component 1092 matches text data against a database of recorded speech. Matching units are selected and concatenated together to form audio data. In another method of synthesis called parametric synthesis, the TTS component 1092 varies parameters such as frequency, volume, and noise to create an artificial speech waveform output. Parametric synthesis uses a computerized voice generator, sometimes called a vocoder.

The various components may exist in software, hardware, firmware, or some combination thereof.

The user recognition component 1060 may recognize one or more users using a variety of data. As illustrated in FIG. 10, the user recognition component 1060 may include one or more subcomponents including a vision component 1061, an audio component 1062, a biometric component 1063, a radio frequency (RF) component 1064, a machine learning (ML) component 1065, and a recognition confidence component 1066. In some instances, the user recognition component 1060 may monitor data and determinations from one or more subcomponents to determine an identity of one or more users in an environment. The user recognition component 1060 may output user recognition data 1080, which may include a probability value and/or a user identifier associated with a user the system believes is interacting with the system. The user recognition data 1080 may be used to inform NLU component 1054 processes as well as processing performed by speechlets 1090, skill servers 1040, routing of output data, permission access to further information, etc.

The vision component 1061 may receive data from one or more sensors capable of providing images (e.g., cameras) or sensors indicating motion (e.g., motion sensors). The vision component 1061 can perform facial recognition or image analysis to determine an identity of a user and to associate that identity with a user profile associated with the user. In some instances, when a user is facing a camera, the vision component 1061 may perform facial recognition and identify the user with a high degree of confidence. In other instances, the vision component 1061 may have a low degree of confidence of an identity of a user, and the user recognition component 1060 may utilize determinations from additional components to determine an identity of a user. The vision component 1061 can be used in conjunction with other components to determine an identity of a user. For example, the user recognition component 1060 may user data from the vision component 1016 with data from the audio component 1062 to identify what user's face appears to be speaking at the same time audio is captured by a device the user is facing for purposes of identifying a user who spoke an utterance.

The system may include biometric sensors that transmit data to the biometric component 1063. For example, the biometric component 1063 may receive data corresponding to fingerprints, iris or retina scans, thermal scans, weights of users, a size of a user, pressure (e.g., within floor sensors), etc., and may determine a biometric profile corresponding to a user. The biometric component 1063 may distinguish between a user and sound from a television, for example. Thus, the biometric component 1063 may incorporate biometric information into a confidence level for determining an identity of a user. Biometric information output by the biometric component 1063 can be associated with a specific user profile such that the biometric information uniquely identifies a user profile of a user.

The RF component 1064 may use RF localization to track devices that a user may carry or wear. For example, a user (and a user profile associated with the user) may be associated with a computing device. The computing device may emit RF signals (e.g., Wi-Fi, Bluetooth®, etc.). A device may detect the signal and indicate to the RF component 1064 the strength of the signal (e.g., as a received signal strength indication (RSSI)). The RF component 1064 may use the RSSI to determine an identity of a user (with an associated confidence level). In some instances, the RF component 1064 may determine that a received RF signal is associated with a mobile device that is associated with a particular user.

In some instances, a device 1010 may include some RF or other detection processing capabilities so that a user who speaks an utterance may scan, tap, or otherwise acknowledge his/her personal device (such as a phone) to the device 1010. In this manner, the user may "register" with the system for purposes of the system determining who spoke a particular utterance. Such a registration may occur prior to, during, or after speaking of an utterance.

The ML component 1065 may track the behavior of various users in the environment as a factor in determining a confidence level of the identity of the user. By way of example, a user may adhere to a regular schedule such that the user is outside the environment during the day (e.g., at work or at school). In this example, the ML component 1065 would factor in past behavior and/or trends into determining the identity of the user that spoke an utterance to the system. Thus, the ML component 1065 may user historical data and/or usage patterns over time to increase or decrease a confidence level of an identity of a user.

In some instances, the recognition confidence component 1066 receives determinations from the various components, and may determine a final confidence level or probability value associated with the identity of a user. In some instances, the confidence level may determine whether an action is performed. For example, if a user request includes a request to unlock a door, a confidence level may need to be above a threshold that may be higher than a confidence level needed to perform a user request associated with playing a playlist or resuming a location in an audiobook. The confidence level or other score data may be included in the user recognition data 1080.

The audio component 1062 may receive data from one or more sensors capable of providing an audio signal (e.g., the device 1010, one or more microphones, etc.) to facilitate recognizing a user. The audio component 1062 may perform audio recognition on an audio signal to determine an identity of the user and an associated user profile. In some instances, aspects of the server(s) 1020 may be configured at a computing device (e.g., a local server) within the environment 202. Thus, in some instances, the audio component 1062 operating on a computing device in the environment may analyze all sound within the environment (e.g., without requiring a wake word) to facilitate recognizing a user. In some instances, the audio component 1062 may perform voice recognition to determine an identity of a user.

The audio component 1062 may also determine whether a user corresponds to a child or not a child based on audio characteristics. The audio component 1062 may include a model trained with respect to speech characteristics common to children. Using the trained model, the audio component 1062 may make a binary determination regarding whether the user that spoke the command is a child. The trained model(s) may determine a child is speaking based on acoustic properties of audio (e.g., pitch, prosody, energy) as well as other data/characteristics (e.g., vocabulary, sentence structure, direction of where audio of an utterance is received from (since children are shorter than adults)).

Child detection can be performed independently of user identity. For example, the system may use user recognition techniques and not be able to identify the specific speaking user, but may still be able to tell that the speaking user is a child or non-adult.

The audio component 1062 may also perform user identification based on information relating to a spoken utterance input into the system for speech processing. For example, the audio component 1062 may take as input the audio data 1012 and/or output data from the ASR component 1052. The audio component 1062 may determine scores indicating whether the command originated from particular users. For example, a first score may indicate a likelihood that the command originated from a first user, a second score may indicate a likelihood that the command originated from a second user, etc. The audio component 1062 may perform user recognition by comparing speech characteristics in the audio data 1012 to stored speech characteristics of users.

Figure 11:
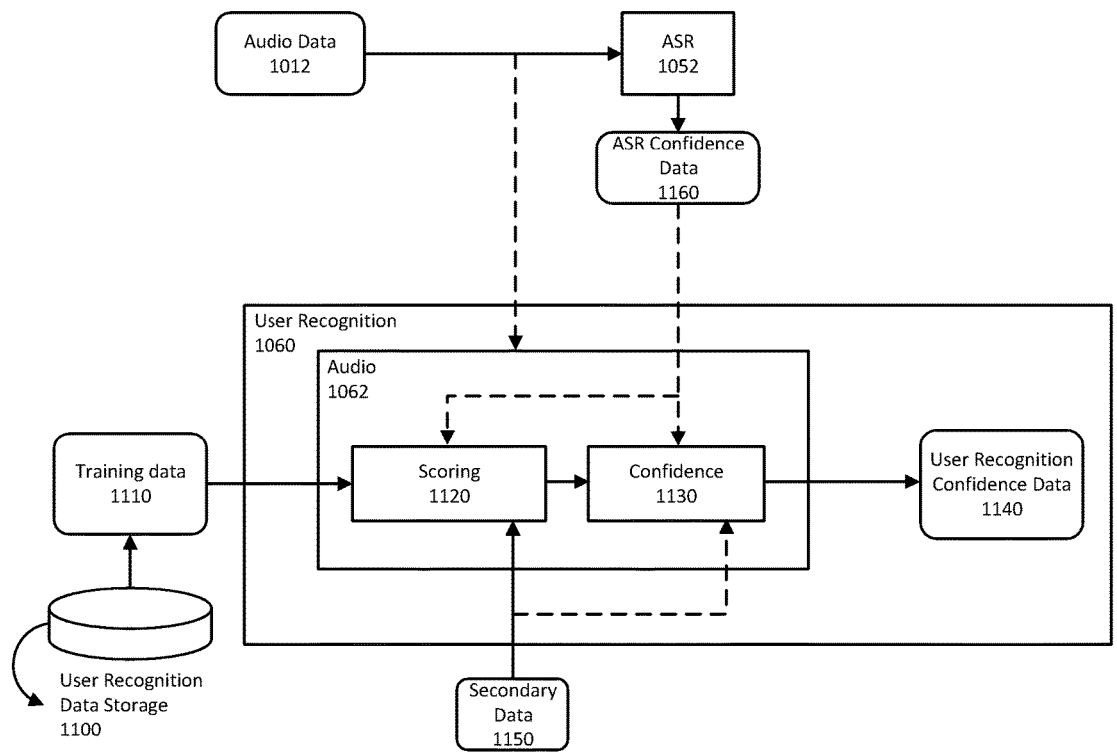
FIG. 11 is a system flow diagram illustrating user recognition in accordance with one or more example embodiments of the disclosure.

FIG. 11 illustrates the audio component 1062 of the user recognition component 1060 performing user recognition using audio data, for example input audio data 1012 corresponding to an input utterance. In addition to outputting text data as described above, the ASR component 1052 may also output ASR confidence data 1160, which is passed to the user recognition component 1060. The audio component 1062 performs user recognition using various data including the audio data 1012, training data 1110 corresponding to sample audio data corresponding to known users, the ASR confidence data 1160, and secondary data 1150. The audio component 1062 may output user recognition confidence data 1140 that reflects a certain confidence that the input utterance was spoken by one or more particular users. The user recognition confidence data 1140 may include an indicator of a verified user (such as a user ID corresponding to the speaker of the utterance) along with a confidence value corresponding to the user ID, such as a numeric value or binned value as discussed below. The user recognition confidence data 1140 may be used by various components, including other components of the user recognition component 1060 to recognize a user.

The training data 1110 may be stored in a user recognition data storage 1100. The user recognition data storage 1100 may be stored by the server(s) 1040, or may be a separate device. Further, the user recognition data storage 1100 may be part of a user profile in the profile storage 1072. The user recognition data storage 1100 may be a cloud-based storage. The training data 1110 stored in the user recognition data storage 1100 may be stored as waveforms and/or corresponding features/vectors. The training data 1110 may correspond to data from various audio samples, each audio sample associated with a known user and/or user identity. The audio samples may correspond to voice profile data for one or more users. For example, each user known to the system may be associated with some set of training data 1110/voice profile data for the known user. Thus, the training data 1110 may include a biometric representation of a user's voice. The audio component 1062 may then use the training data 1110 to compare against incoming audio data 1012 to determine the identity of a user speaking an utterance. The training data 1110 stored in the user recognition data storage 1100 may thus be associated with multiple users of multiple devices. Thus, the training data 1110 stored in the user recognition data storage 1100 may be associated with both a user that spoke the respective utterance, as well as the device 1010 that captured the respective utterance.

To perform user recognition, the audio component 1062 may determine the device 1010 from which the audio data 1012 originated. For example, the audio data 1012 may include a tag or other metadata indicating the device 1010. Either the device 1010 or the server(s) 1040 may tag the audio data 1012 as such. The user recognition component 1060 may send a signal to the user recognition data storage 1100, with the signal requesting only training data 1110 associated with known users of the device 1010 from which the audio data 1012 originated. This may include accessing a user profile(s) associated with the device 1010 and then only inputting training data 1110 associated with users corresponding to the user profile(s) of the device 1010. This limits the universe of possible training data the audio component 1062 should consider at runtime when recognizing a user and thus decreases the amount of time to perform user recognition by decreasing the amount of training data 1110 needed to be processed. Alternatively, the user recognition component 1060 may access all (or some other subset of) training data 1110 available to the system. Alternatively, the audio component 1062 may access a subset of training data 1110 of users potentially within the environment of the device 1010 from which the audio data 1012 originated, as may otherwise have been determined by the user recognition component 1060.

If the audio component 1062 receives training data 1110 as an audio waveform, the audio component 1062 may determine features/vectors of the waveform(s) or otherwise convert the waveform into a data format that can be used by the audio component 1062 to actually perform the user recognition. The audio component 1062 may then identify the user that spoke the utterance in the audio data 1012 by comparing features/vectors of the audio data 1012 to training features/vectors (either received from the user recognition data storage 1100 or determined from training data 1110 received from the user recognition data storage 1100).

The audio component 1062 may include a scoring component 1120 which determines respective scores indicating whether the input utterance (represented by the audio data 1012) was spoken by particular users (represented by the training data 1110). The audio component 1062 may also include a confidence component 1130 that determines an overall confidence as the accuracy of the user recognition operations (such as those of the scoring component 1120) and/or an individual confidence for each user potentially identified by the scoring component 1120. The output from the scoring component 1120 may include scores for all users with respect to which user recognition was performed (e.g., all users associated with the device 1010). For example, the output may include a first score for a first user, a second score for a second user, and third score for a third user, etc. Although illustrated as two separate components, the scoring component 1120 and confidence component 1130 may be combined into a single component or may be separated into more than two components.

The scoring component 1120 and confidence component 1130 may implement one or more trained machine learning models (such neural networks, classifiers, etc.) as known in the art. For example, the scoring component 1120 may use probabilistic linear discriminant analysis (PLDA) techniques. PLDA scoring determines how likely it is that an input audio data feature vector corresponds to a particular training data feature vector for a particular user. The PLDA scoring may generate similarity scores for each training feature vector considered and may output the list of scores and users and/or the user ID of the speaker whose training data feature vector most closely corresponds to the input audio data feature vector. The scoring component 1120 may also use other techniques such as GMMs, generative Bayesian models, or the like, to determine similarity scores.

The confidence component 1130 may input various data including information about the ASR confidence data 1160, utterance length (e.g., number of frames or time of the utterance), audio condition/quality data (such as signal-to-interference data or other metric data), fingerprint data, image data, or other factors to consider how confident the audio component 1062 is with regard to the scores linking users to the input utterance. The confidence component 1130 may also consider the similarity scores and user IDs output by the scoring component 1120. Thus, the confidence component 1130 may determine that a lower ASR confidence represented in the ASR confidence data 1160, or poor input audio quality, or other factors, may result in a lower confidence of the audio component 1062. Whereas a higher ASR confidence represented in the ASR confidence data 1160, or better input audio quality, or other factors, may result in a higher confidence of the audio component 1062. Precise determination of the confidence may depend on configuration and training of the confidence component 1130 and the models used therein. The confidence component 1130 may operate using a number of different machine learning models/techniques such as GMM, neural networks, etc. For example, the confidence component 1130 may be a classifier configured to map a score output by the scoring component 1120 to a confidence.

The audio component 1062 may output user recognition confidence data 1140 specific to a single user, or multiple users in the form of an N-best list. For example, the audio component 1062 may output user recognition confidence data 1140 with respect to each user indicated in the profile associated with the device 1010 from which the audio data 1012 was received. The audio component 1062 may also output user recognition confidence data 1140 with respect to each user potentially in the location of the device 1010 from which the audio data 1012 was received.

The user recognition confidence data 1140 may include particular scores (e.g., 0.0-1.0, 0-1000, or whatever scale the system is configured to operate). Thus, the system may output an N-best list of potential users with confidence scores (e.g., John—0.2, Jane—0.8). Alternatively or in addition, the user recognition confidence data 1140 may include binned recognition indicators. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the system may output an N-best list of potential users with binned scores (e.g., John—low, Jane—high). Combined binned and confidence score outputs are also possible. Rather than a list of users and their respective scores and/or bins, the user recognition confidence data 1140 may only include information related to the top scoring user as determined by the audio component 1062. The scores and bins may be based on information determined by the confidence component 1130. The audio component 1062 may also output a confidence value that the scores/bins are correct, where the confidence value indicates how confident the audio component 1062 is in the output results. This confidence value may be determined by the confidence component 1130.

The confidence component 1130 may determine individual user confidences and differences between user confidences when determining the user recognition confidence data 1140. For example, if a difference between a first user's confidence score and a second user's confidence score is large, and the first user's confidence score is above a threshold, then the audio component 510 is able to recognize the first user as the user that spoke the utterance with a much higher confidence than if the difference between the users' confidences were smaller.

The audio component 1062 may perform certain thresholding to avoid incorrect user recognition results being output. For example, the audio component 1062 may compare a confidence score output by the confidence component 1130 to a confidence threshold. If the confidence score is not above the confidence threshold (for example, a confidence of "medium" or higher), the user audio component 1062 may not output user recognition confidence data 1140, or may only include in that data 1140 an indication that a user speaking the utterance could not be verified. Further, the audio component 1062 may not output user recognition confidence data 1140 until enough input audio data 1012 is accumulated and processed to verify the user above a threshold confidence. Thus, the audio component 1062 may wait until a sufficient threshold quantity of audio data 1012 of the utterance has been processed before outputting user recognition confidence data 1140. The quantity of received audio data 1012 may also be considered by the confidence component 1130.

The audio component 1062 may be defaulted to output binned (e.g., low, medium, high) user recognition confidence data 1140. However, such may be problematic from the speechlet(s) 1090 and skill server(s) 1040 perspectives. For example, if the audio component 1062 computes a single binned confidence for multiple users, a speechlet(s) 1090/skill server(s) 1040 may not be able to determine which user to determine content with respect to. In this situation, the audio component 1062 may be configured to override its default setting and output user recognition confidence data 1140 including values (e.g., 0.0-1.0) associated with the users associated with the same binned confidence. This enables the speechlet(s) 1090/skill server(s) 1040 to select content associated with the user associated with the highest confidence value. The user recognition confidence data 1140 may also include the user IDs corresponding to the potential user(s) who spoke the utterance.

The user recognition component 1060 may combine data from components to determine the identity of a particular user. As part of its audio-based user recognition operations, the audio component 1062 may use secondary data 1150 to inform user recognition processing. Thus, a trained model or other component of the audio component 1062 may be trained to take secondary data 1150 as an input feature when performing recognition. Secondary data 1150 may include a wide variety of data types depending on system configuration and may be made available from other sensors, devices, or storage such as user profile data, etc. The secondary data 1150 may include a time of day at which the audio data 1012 was captured, a day of a week in which the audio data 1012 was captured, the text data output by the ASR component 1052, NLU results data, and/or other data.

In one example, secondary data 1150 may include image data or video data. For example, facial recognition may be performed on image data or video data received corresponding to the received audio data 1012. Facial recognition may be performed by the vision component 1061, or by another component of the server(s) 1040. The output of the facial recognition process may be used by the audio component 1062. That is, facial recognition output data may be used in conjunction with the comparison of the features/vectors of the audio data 1012 and training data 1110 to perform more accurate user recognition.

The secondary data 1150 may also include location data of the device 1010. The location data may be specific to a building within which the device 1010 is located. For example, if the device 1010 is located in user A's bedroom, such location may increase user recognition confidence data associated with user A, but decrease user recognition confidence data associated with user B.

The secondary data 1150 may also include data related to the profile of the device 1010. For example, the secondary data 1150 may further include type data indicating a type of the device 1010. Different types of devices may include, for example, a smart watch, a smart phone, a tablet computer, and a vehicle. The type of device may be indicated in the profile associated with the device. For example, if the device 1010 from which the audio data 1012 was received is a smart watch or vehicle belonging to user A, the fact that the device 1010 belongs to user A may increase user recognition confidence data associated with user A, but decrease user recognition confidence data associated with user B. Alternatively, if the device 1010 from which the audio data 1012 was received is a public or semi-public device, the system may user information about the location of the device to cross-check other potential user locating information (such as calendar data, etc.) to potentially narrow the potential users to be recognized with respect to the audio data 1012.

The secondary data 1150 may additionally include geographic coordinate data associated with the device 1010. For example, a profile associated with a vehicle may indicate multiple users (e.g., user A and user B). The vehicle may include a global positioning system (GPS) indicating latitude and longitude coordinates of the vehicle when the audio data 1012 is captured by the vehicle. As such, if the vehicle is located at a coordinate corresponding to a work location/building of user A, such may increase user recognition confidence data associated with user A, but decrease user recognition confidence data of all other users indicated in the profile associated with the vehicle. Global coordinates and associated locations (e.g., work, home, etc.) may be indicated in a user profile associated with the device 1010. The global coordinates and associated locations may be associated with respective users in the user profile storage 1072.

The secondary data 1150 may also include other data/signals about activity of a particular user that may be useful in performing user recognition of an input utterance. For example, if a user has recently entered a code to disable a home security alarm, and the utterance corresponds to a device at the home, signals from the home security alarm about the disabling user, time of disabling, etc. may be reflected in the secondary data 1150 and considered by the audio component 1062. If a mobile device (such as a phone, Tile, dongle, or other device) known to be associated with a particular user is detected proximate to (for example physically close to, connected to the same WiFi network as, or otherwise nearby) the device 1010, this may be reflected in the secondary data 1150 and considered by the audio component 1062.

The user recognition confidence data 1140 output by the audio component 1062 may be used by other components of the user recognition component 1060 and/or may be sent to one or more speechlets 1090, skill servers 1040, the orchestrator 1070, or to other components. The speechlet(s) 1090/skill server(s) 1040 that receives the NLU results and the user recognition confidence score data 1140 (or other user recognition results as output by the user recognition component 1060) may be determined by the server(s) 1040 as corresponding to content responsive to the utterance in the audio data 1012. For example, if the audio data 1012 includes the utterance "Play my music," the NLU results and user recognition confidence data 1140 (or other output user recognition data) may be sent to a music playing speechlet(s) 1090/skill server(s) 1040.

Figure 12:
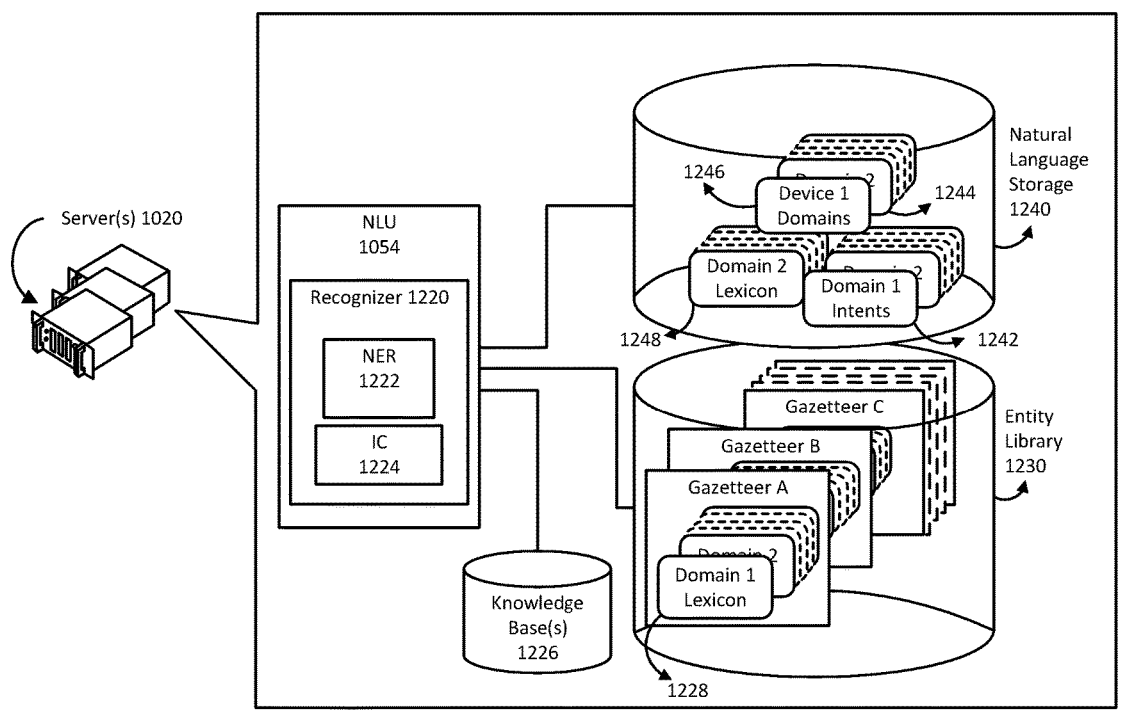
FIGS. 12-13 are schematic diagrams of how natural language processing may be performed in accordance with one or more example embodiments of the disclosure.

FIG. 12 illustrates how NLU processing is performed on audio data. Generally, the NLU component 1054 attempts to make a semantic interpretation of text represented in text data (e.g., ASR results output by the ASR component 1052). That is, the NLU component 1054 determines the meaning behind the text represented in text data based on the individual words. The NLU component 1054 interprets text to derive an intent or a desired action from an utterance as well as the pertinent pieces of information in the text that allow a device (e.g., device 1010, server(s) 1040, speechlet(s) 1090, skill server(s) 1040) to complete that action.

The NLU component 1054 may process text data including several textual interpretations of a single utterance. For example, if the ASR component 1052 outputs ASR results including an N-best list of textual interpretations, the NLU component 1054 may process the text data with respect to all (or a portion of) the textual interpretations represented therein.

The NLU component 1054 may include one or more recognizers 1220. Each recognizer 1220 may be associated with a different speechlet 1090. The NLU component 1054 may determine a speechlet 1090 potentially associated with a textual interpretation represented in text data input thereto in order to determine the proper recognizer 1220 to process the textual interpretation. The NLU component 1054 may determine a single textual interpretation is potentially associated with more than one speechlet 1090. Multiple recognizers 1220 may be functionally linked (e.g., a telephony/communications recognizer and a calendaring recognizer may utilize data from the same contact list).

If the NLU component 1054 determines a specific textual interpretation is potentially associated with multiple speechlets 1090, the recognizers 1220 associated with the speechlets 1090 may process the specific textual interpretation in parallel. For example, if a specific textual interpretation potentially implicates both a communications speechlet and a music speechlet, a recognizer associated with the communications speechlet may process the textual interpretation in parallel, or substantially in parallel, with a recognizer associated with the music speechlet processing the textual interpretation. The output generated by each recognizer may be scored, with the overall highest scored output from all recognizers ordinarily being selected to be the correct result.

The NLU component 1054 may communicate with various storages to determine the potential speechlet(s) associated with a textual interpretation. The NLU component 1054 may communicate with an NLU storage 1240, which includes databases of devices (1246) identifying speechlets associated with specific devices. For example, the device 1010 may be associated with speechlets for music, calendaring, contact lists, device-specific communications, etc. In addition, the NLU component 1054 may communicate with an entity library 1230, which includes database entries about specific services on a specific device, either indexed by device ID, user ID, or group user ID, or some other indicator.

Each recognizer 1220 may include a named entity recognition (NER) component 1222. The NER component 1222 attempts to identify grammars and lexical information that may be used to construe meaning with respect to a textual interpretation input therein. The NER component 1222 identifies portions of text represented in text data input into the NLU component 1054 that correspond to a named entity that may be recognizable by the system. The NER component 1222 (or other component of the NLU component 1054) may also determine whether a word refers to an entity that is not explicitly mentioned in the utterance text, for example "him," "her," "it" or other anaphora, exophora, or the like.

Each recognizer 1220, and more specifically each NER component 1222, may be associated with a particular grammar model and/or database 1248, a particular set of intents/actions 1242, and a particular personalized lexicon 1228. Each gazetteer may include speechlet-indexed lexical information associated with a particular user and/or device. For example, the Gazetteer A includes speechlet-indexed lexical information 1228. A user's music speechlet lexical information might include album titles, artist names, and song names, for example, whereas a user's contact-list lexical information might include the names of contacts. Since every user's music collection and contact list is presumably different, this personalized information improves entity resolution.

An NER component 1222 applies grammar models 1248 and lexical information 1228 associated with the speechlet (associated with the recognizer 1220 implementing the NER component 1222) to determine a mention one or more entities in a textual interpretation input therein. In this manner, the NER component 1222 identifies "slots" (i.e., particular words in a textual interpretation) that may be needed for later command processing. The NER component 1222 may also label each slot with a type of varying levels of specificity (e.g., noun, place, city, artist name, song name, etc.).

Each grammar model 1248 includes the names of entities (i.e., nouns) commonly found in speech about the particular speechlet to which the grammar model 1248 relates, whereas the lexical information 1228 is personalized to the user(s) and/or the device 1010 from which the audio data 1012 originated. For example, a grammar model 1248 associated with a shopping speechlet may include a database of words commonly used when people discuss shopping.

A downstream process called named entity resolution actually links a portion of text to an actual specific entity known to the system. To perform named entity resolution, the NLU component 1054 may utilize gazetteer information stored in an entity library storage 1230. The gazetteer information may be used to match text represented in text data output by the ASR component 1052 with different entities, such as song titles, contact names, etc. Gazetteers may be linked to users (e.g., a particular gazetteer may be associated with a specific user's music collection), may be linked to certain speechlet categories (e.g., shopping, music, video, communications, etc.), or may be organized in a variety of other ways.

Each recognizer 1220 may also include an intent classification (IC) component 1224. The IC component 1224 parses an input textual interpretation to determine an intent(s) of the speechlet associated with the recognizer 1220 that potentially corresponds to the textual interpretation. An intent corresponds to an action to be performed that is responsive to the command represented by the textual interpretation. The IC component 1224 may communicate with a database 1242 of words linked to intents. For example, a music intent database may link words and phrases such as "quiet," "volume off," and "mute" to a "mute" intent. The IC component 1224 identifies potential intents by comparing words in the textual interpretation to the words and phrases in an intents database 1242 associated with the speechlet that is associated with the recognizer 1220 implementing the IC component 1224.

The intents identifiable by a specific IC component 1224 are linked to speechlet-specific (i.e., the speechlet associated with the recognizer 1220 implementing the IC component 1224) grammar frameworks 1248 with "slots" to be filled. Each slot of a grammar framework 1248 corresponds to a portion of the text interpretation that the system believes corresponds to an entity. For example, a grammar framework 1248 corresponding to a <PlayMusic> intent may correspond to textual interpretation sentence structures such as "Play {Artist Name}," "Play {Album Name}," "Play {Song name}," "Play {Song name} by {Artist Name}," etc. However, to make resolution more flexible, grammar frameworks 1248 may not be structured as sentences, but rather based on associating slots with grammatical tags.

For example, an NER component 1222 may parse a textual interpretation to identify words as subject, object, verb, preposition, etc. based on grammar rules and/or models prior to recognizing named entities in the textual interpretation. An IC component 1224 (implemented by the same recognizer 1220 as the NER component 1222) may use the identified verb to identify an intent. The NER component 1222 may then determine a grammar model 1248 associated with the identified intent. For example, a grammar model 1248 for an intent corresponding to <PlayMusic> may specify a list of slots applicable to play the identified "object" and any object modifier (e.g., a prepositional phrase), such as {Artist Name}, {Album Name}, {Song name}, etc. The NER component 1222 may then search corresponding fields in a lexicon 1228 associated with the speechlet associated with the recognizer 1220 implementing the NER component 1222, attempting to match words and phrases in the textual interpretation the NER component 1222 previously tagged as a grammatical object or object modifier with those identified in the lexicon 1228.

An NER component 1222 may perform semantic tagging, which is the labeling of a word or combination of words according to their type/semantic meaning. An NER component 1222 may parse a textual interpretation heuristic grammar rules, or a model may be constructed using techniques such as hidden Markov models, maximum entropy models, log linear models, conditional random fields (CRF), and the like. For example, an NER component 1222 implemented by a music speechlet recognizer 1220 may parse and tag a textual interpretation corresponding to "play mother's little helper by the rolling stones" as {Verb}: "Play," {Object}: "mother's little helper," {Object Preposition}: "by," and {Object Modifier}: "the rolling stones." The NER component 1222 identifies "Play" as a verb based on a word database associated with the music speechlet, which an IC component 1224 (also implemented by the music speechlet recognizer 1220) may determine corresponds to a <PlayMusic> intent. At this stage, no determination has been made as to the meaning of "mother's little helper" and "the rolling stones," but based on grammar rules and models, the NER component 1222 has determined that the text of these phrases relates to the grammatical object (i.e., entity) of the textual interpretation.

The frameworks linked to the intent are then used to determine what database fields should be searched to determine the meaning of these phrases, such as searching a user's gazetteer for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve a slot/field using gazetteer information, the NER component 1222 may search the database of generic words associated with the speechlet (in the knowledge base 1226). For example, if the textual interpretation was "play songs by the rolling stones," after failing to determine an album name or song name called "songs" by "the rolling stones," the NER component 1222 may search the speechlet vocabulary for the word "songs." In the alternative, generic words may be checked before the gazetteer information, or both may be tried, potentially producing two different results.

The NLU component 1054 may tag the textual interpretation to attribute meaning to the textual interpretation. For example, the NLU component 1054 may tag "play mother's little helper by the rolling stones" as: {intent}<PlayMusic>, {artist name} rolling stones, {media type} SONG, and {song title} mother's little helper. For further example, the NLU component 1054 may tag "play songs by the rolling stones" as: {intent}<PlayMusic>, {artist name} rolling stones, and {media type} SONG.

Certain recognizers 1220 may only be authorized to operate for certain users. For example, some recognizers 1220 may only be authorized to operate for adult users (e.g., users of eighteen years of age or older). The NLU component 1054 may use some combination of user recognition data 1080 user profile data to confirm the user's identity/type. Based thereon, the NLU component 1054 may determine which recognizers 1220 may operate with respect to input text data (i.e., ASR results 741).

Figure 13:
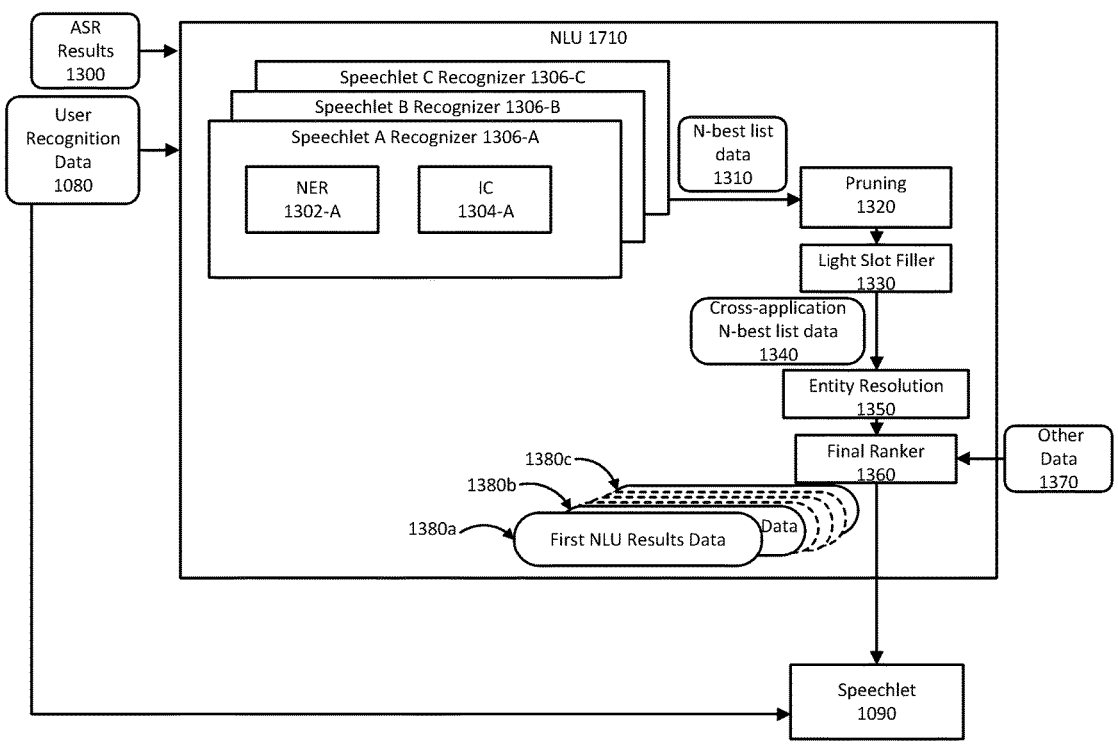

Each recognizer 1220 may output data corresponding to a single textual interpretation or to an N-best list of textual interpretations. The NLU component 1054 may compile the output data of the recognizers 1220 into a single N-best list, and may send N-best list data 1310 (representing the N-best list) to a pruning component 1320 (as illustrated in FIG. 13). The tagged textual interpretations in the N-best list data 1310 may each be associated with a respective score indicating the tagged textual interpretation corresponds to the speechlet associated with the recognizer 1220 from which the tagged textual interpretation was output. For example, the N-best list data 1310 may be represented as:

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 1320 creates a new, shorter N-best list (i.e., represented in N-best list data 1340 discussed below) based on the N-best list data 1310. The pruning component 1320 may sort the tagged textual interpretations represented in the N-best list data 1310 according to their respective scores.

The pruning component 1320 may perform score thresholding with respect to the N-best list data 1310. For example, the pruning component 1320 may select textual interpretations represented in the N-best list data 1310 associated with a score satisfying (e.g., meeting and/or exceeding) a score threshold. The pruning component 1320 may also or alternatively perform number of textual interpretation thresholding. For example, the pruning component 1320 may select the top scoring textual interpretation(s) associated with each different category of speechlet (e.g., music, shopping, communications, etc.) represented in the N-best list data 1310, with the new N-best list data 1340 including a total number of textual interpretations meeting or falling below a threshold number of textual interpretations. The purpose of the pruning component 1320 is to create a new list of top scoring textual interpretations so that downstream (more resource intensive) processes may only operate on the tagged textual interpretations that most likely correspond to the command input to the system.

The NLU component 1054 may also include a light slot filler component 1330. The light slot filler component 1330 can take text from slots represented in the textual interpretation(s) output by the pruning component 1320 and alter it to make the text more easily processed by downstream components. The light slot filler component 1330 may perform low latency operations that do not involve heavy operations such as reference to a knowledge base. The purpose of the light slot filler component 1330 is to replace words with other words or values that may be more easily understood by downstream components. For example, if a textual interpretation includes the word "tomorrow," the light slot filler component 1330 may replace the word "tomorrow" with an actual date for purposes of downstream processing. Similarly, the light slot filler component 1330 may replace the word "CD" with "album" or the words "compact disc." The replaced words are then included in the N-best list data 1340.

The NLU component 1054 sends the N-best list data 1340 to an entity resolution component 1350. The entity resolution component 1350 can apply rules or other instructions to standardize labels or tokens from previous stages into an intent/slot representation. The precise transformation may depend on the speechlet (e.g., for a travel speechlet, the entity resolution component 1350 may transform a text mention of "Atlanta airport" to the standard ATL three-letter code referring to the airport). The entity resolution component 1350 can refer to an authority source (e.g., a knowledge base) that is used to specifically identify the precise entity referred to in each slot of each textual interpretation represented in the N-best list data 1340. Specific intent/slot combinations may also be tied to a particular source, which may then be used to resolve the text. In the example "play songs by the stones," the entity resolution component 1350 may reference a personal music catalog, Amazon Music account, user profile 802 (described herein), or the like. The entity resolution component 1350 may output data including an altered N-best list that is based on the N-best list represented in the N-best list data 1340, but also includes more detailed information (e.g., entity IDs) about the specific entities mentioned in the slots and/or more detailed slot data that can eventually be used by a speechlet(s) 1090 which may be incorporated into the server(s) 1040 components or pipeline or may be on a separate device(s) (e.g., a skill server(s) 1040) in communication with the server(s) 1040. The NLU component 1054 may include multiple entity resolution components 1350 and each entity resolution component 1350 may be specific to one or more speechlets.

The entity resolution component 1350 may not be successful in resolving every entity and filling every slot represented in the N-best list represented in the N-best list data 1340. This may result in the entity resolution component 1350 outputting incomplete results. The NLU component 1054 may include a final ranker component 1360, which may consider such errors when determining how to rank the tagged textual interpretations for potential execution. For example, if a book speechlet recognizer 1220 outputs a tagged textual interpretation including a <ReadBook> intent flag, but the entity resolution component 1350 cannot find a book with a title matching the text of the item, the final ranker component 1360 may re-score that particular tagged textual interpretation to be given a lower score. The final ranker component 1360 may also assign a particular confidence to each tagged textual interpretation input therein. The confidence score of a particular tagged textual interpretation may be affected by whether the tagged textual interpretation has unfilled slots. For example, if a tagged textual interpretation associated with a first speechlet includes slots that are all filled/resolved, that tagged textual interpretation may be associated with a higher confidence than another tagged textual interpretation including at least some slots that are unfilled/unresolved.

The final ranker component 1360 may apply re-scoring, biasing, or other techniques to obtain the most preferred tagged and resolved textual interpretation. To do so, the final ranker component 1360 may consider not only the data output by the entity resolution component 1350, but may also consider other data 1370. The other data 1370 may include a variety of information. For example, the other data 1370 may include speechlet rating or popularity data. For example, if one speechlet has a particularly high rating, the final ranker component 1360 may increase the score of a textual interpretation(s) associated with or otherwise invoking that particular speechlet. The other data 1370 may also include information about speechlets that have been specifically enabled by the user. For example, the final ranker component 1360 may assign higher scores to textual interpretations associated with or otherwise invoking enabled speechlets than textual interpretations associated with or otherwise invoking non-enabled speechlets. User history may also be considered, such as if the user regularly uses a particular speechlet or does so at particular times of day. Date, time, location, weather, type of device 1010, user ID, context, and other information may also be considered. For example, the final ranker component 1360 may consider when any particular speechlets are currently active (e.g., music being played, a game being played, etc.).

Following final ranking, the NLU component 1054 may output NLU output data 1380. The NLU component 1054 may send the NLU output data 1380 to the orchestrator component 1070, which sends the NLU output data 1380 to an appropriate speechlet 1090 or skill server(s) 1040 (e.g., one configured to execute a command based on the textual interpretation represented in the NLU output data 1380). The NLU output data 1380 may include an indicator of the intent of the textual interpretation along with data associated with the intent, for example an indication that the intent is <PlayMusic> and the music to be played is "Adele." Multiple instances of NLU output data (e.g., 1380a-1380n) may be output for a given set of text data input into the NLU component 1054.

The speechlet(s) 1090/skill server(s) 1040 provides the server(s) 1040 with data responsive to the NLU output data 1380 received thereby. If the data is text data that needs to be converted to computerized speech, the orchestrator component 1070 sends the text data to the TTS component 1092.

User recognition data 1080 may also be used by the NLU component 1054 and/or the speechlet 1090/skill server(s) 1040 to ensure that any user specific commands are properly interpreted and executed.

A user identified using techniques described herein may be associated with a user identifier (ID), user profile, or other information known about the user by the system. As part of the user recognition techniques described herein, the system may determine the user identifier, user profile, or other such information. The profile storage 1072 may include data corresponding to profiles that may be used by the system to perform speech processing. Such profiles may include a user profile that links various data about a user such as user preferences, user owned devices, address information, contacts, enabled speechlets, payment information, etc. Each user profile may be associated with a different user ID. A profile may be an umbrella profile specific to a group of users. That is, a user profile may encompass two or more individual user profiles, each associated with a unique respective user ID. For example, a profile may be a household profile that encompasses user profiles associated with multiple users of a single household. A profile may include preferences shared by all the user profiles encompassed thereby. Each user profile encompassed under a single user profile may include preferences specific to the user associated therewith. That is, each user profile may include preferences unique with respect to one or more other user profiles encompassed by the same profile. A user profile may be a stand-alone profile or may be encompassed under a group profile.

A profile may also be a device profile corresponding to information about a particular device, for example a device ID, location, owner entity, whether the device is in a public, semi-public, or private location (which may be indicated by a public and/or semi-public flag), device capabilities, device hardware, or the like.

A profile may also be an entity profile, for example belonging to a business, organization, or other non-user entity. Such an entity profile may include information that may otherwise be found in a user and/or device profile, only such information is associated with the entity. The entity profile may include information regarding which users and/or devices are associated with the entity.

Figure 14:
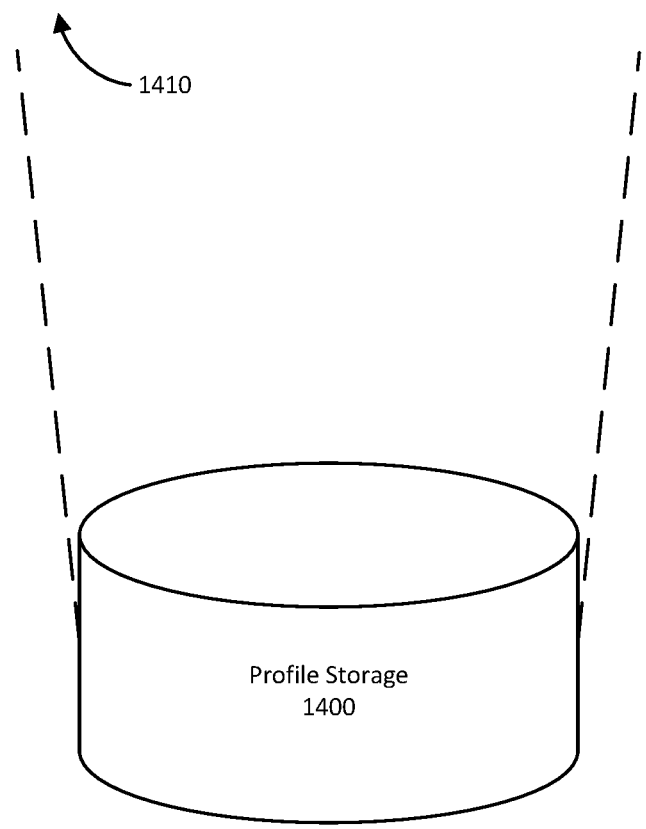
FIG. 14 illustrates data stored and associated with profiles in accordance with one or more example embodiments of the disclosure.

For example, as illustrated in FIG. 14, a group profile 1400 may include information about users, devices, and locations of the devices. In the example illustrated, the group profile 1400 is associated with a home and lists four devices: one device in a living room, one device in a kitchen, one device in a den/office, and one device in a bedroom. Various other information may also be stored and/or associated with a profile.

Program component(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program component(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
    receiving, by one or more computer processors coupled to memory, a first application identifier from a first application on a first device;
    determining a communal mode profile associated with the first application identifier,
wherein the communal mode profile is associated with a first user account identifier and a second user account identifier;
    receiving audio data from the first device, the audio data representative of a user utterance;
    determining that the audio data represents an intent to initiate a synchronous communication session with a named contact;
    determining a third user account identifier associated with the named contact;
    determining a second device identifier associated with the third user account identifier, the second device identifier representing a device that is to be notified for communication sessions directed to the third user account identifier;
    sending a first incoming communication notification to the second device identifier indicative of an incoming communication from the second user account identifier;
    receiving an indication of acceptance of the incoming communication from the second device identifier; and
    establishing a connection between the first device and a second device associated with the second device identifier.

2. The method of claim 1, the method further comprising:
    receiving a second indication from a second application on the first device;
    determining a second application identifier of the second application;
    determining that the first device is in a personal mode using the second application identifier, wherein a single user account is active at the first device in the personal mode;
    determining a personal mode profile associated with the second application identifier, wherein the personal mode profile comprises the first user account identifier; and
    disassociating the communal mode profile.

3. The method of claim 1, further comprising:
determining an accessory device identifier representing an accessory device coupled to the first device; and
determining that the communal mode profile is associated with the accessory device identifier, wherein coupling the first device to the accessory device causes the communal mode profile to be associated with the first device.

4. A method comprising:
receiving, by one or more computer processors coupled to memory, a first application identifier from a first device, wherein the first application identifier is associated with the first device being coupled to a second device;
determining a communal mode profile for the first device, wherein the communal mode profile is associated with a plurality of personal user accounts comprising a first user account identifier;
receiving a second application identifier indicating the first device being decoupled from the second device; and
determining a personal mode profile for the first device based at least in part on receiving the second application identifier, wherein the personal mode profile is associated with a single personal user account.

5. The method of claim 4, wherein receiving the second application identifier comprises receiving the second application identifier from a second application, the method further comprising:
determining that the first device is in the personal mode using the second application identifier.

6. The method of claim 4, wherein receiving the second application identifier comprises receiving the second application identifier from the first application, the method further comprising:
determining that the first device is in the personal mode using the second application identifier.

7. The method of claim 4, further comprising:
receiving first audio data;
determining that the first audio data represents a request to initiate a communication to a first named contact;
determining a second user account identifier associated with the first named contact;
determining a first set of device identifiers associated with the second user account identifier, the first set of device identifiers comprising a second device identifier of a second device; and
sending a first notification of the communication session to the second device.

8. The method of claim 7, further comprising:
determining a probability value indicative of a likelihood that the first audio data was spoken by a user identified by the first user identifier based at least in part on attributes of the first audio data; and
determining that the probability value satisfies a confidence threshold;
wherein sending the first notification of the communication session to the second device comprises sending the first notification of the communication session to the second device, wherein the first notification indicates the communication session is from the first user account identifier.

9. The method of claim 7, wherein the communal mode profile comprises a third user account identifier, the method further comprising:
determining a first contact list associated with the first user account identifier; and
determining a second contact list associated with the third user account identifier;
wherein determining the second user account identifier associated with the first named contact comprises determining the second user account identifier associated with the first named contact using the first contact list and the second contact list.

10. The method of claim 9, further comprising:
determining that the first named contact is present in the second contact list;
wherein sending the first notification of the communication session to the second device identifier comprises sending the first notification of the communication session to the second device identifier, wherein the first notification indicates the communication session is from the third user account identifier.

11. The method of claim 4, further comprising:
receiving a request to initiate a communication session to the first user account identifier;
sending a first incoming communication session notification to the accessory device; and
sending a second incoming communication session notification to the first device.

12. The method of claim 4, further comprising:
determining that a second device is present in an ambient environment of the first device;
determining a second user account identifier associated with the second device; and
associating the second user account identifier with the communal mode profile.

13. The method of claim 4, further comprising:
receiving a request to access content associated with a subscription service provider;
determining that at least one user account identifier associated with the communal mode profile is authorized to access the content; and
determining that the request to access the content is approved.

14. The method of claim 4, further comprising:
determining a personal mode profile for the first device, wherein the personal mode profile is associated with one or more user account identifiers of a user.

15. The method of claim 4, further comprising:
determining an accessory device identifier representing an accessory device coupled to the first device; and
determining the communal mode profile associated with the accessory device identifier, the communal mode profile comprising a second user account identifier.

16. A system comprising:
memory that stores computer-executable instructions; and
at least one processor configured to access the memory and execute the computer-executable instructions to:
receive a first application identifier from a first device, wherein the first application identifier is associated with the first device being coupled to a second device;
determine a communal mode profile for the first device, wherein the communal mode profile is associated with a plurality of personal user accounts comprising a first user account identifier;
receive a second application identifier indicating the first device being decoupled from the second device; and
determine a personal mode profile for the first device based at least in part on receiving the second application identifier, wherein the personal mode profile is associated with a single personal user account.

17. The system of claim 16, wherein the at least one processor is configured to receive the second application identifier by receiving the second application identifier from a second application, and wherein the at least one processor is further configured to access the memory and execute the computer-executable instructions to:
    determine that the first device is in the personal mode using the second application identifier.

18. The system of claim 16, wherein the at least one processor is further configured to access the memory and execute the computer-executable instructions to:
    receive first audio data;
    determine that the first audio data represents a request to initiate a communication to a first named contact;
    determine a second user account identifier associated with the first named contact;
    determine a first set of device identifiers associated with the second user account identifier, the first set of device identifiers comprising a second device identifier of a second device; and
    send a first notification of the communication to the second device.

19. The system of claim 18, wherein the set of user account identifiers comprises a third user account identifier, and wherein the at least one processor is further configured to access the memory and execute the computer-executable instructions to:
    determine a first contact list associated with the first user account identifier; and
    determine a second contact list associated with the third user account identifier;
    wherein the at least one processor is configured to determine the second user account identifier associated with the first name by determining the second user account identifier associated with the first named contact using the first contact list and the second contact list.

20. The system of claim 18, wherein the at least one processor is further configured to access the memory and execute the computer-executable instructions to:
    determine a probability value indicative of a likelihood that the first audio data was spoken by a user identified by the first user identifier based at least in part on attributes of the first audio data; and
    determine that the probability value satisfies a confidence threshold;
    wherein the at least one processor is configured to send the first notification of the communication session to the second device by sending the first notification of the communication session to the second device, wherein the first notification indicates the communication session is from the first user account identifier.

* * * * *